(12) United States Patent
Chastain

(10) Patent No.: US 9,762,457 B2
(45) Date of Patent: Sep. 12, 2017

(54) DEEP PACKET INSPECTION VIRTUAL FUNCTION

(71) Applicant: AT&T Intellectual Property I, L.P., Atlanta, GA (US)

(72) Inventor: Walter Cooper Chastain, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 172 days.

(21) Appl. No.: 14/552,862

(22) Filed: Nov. 25, 2014

(65) Prior Publication Data

US 2016/0149774 A1 May 26, 2016

(51) Int. Cl.
| | | |
|---|---|---|
| *H04L 12/66* | (2006.01) | |
| *H04L 12/801* | (2013.01) | |
| *H04L 12/26* | (2006.01) | |
| *G06F 9/455* | (2006.01) | |

(52) U.S. Cl.
CPC ........ *H04L 43/028* (2013.01); *G06F 9/45558* (2013.01); *G06F 2009/45562* (2013.01); *G06F 2009/45595* (2013.01)

(58) Field of Classification Search
CPC ........... G06F 9/455; G06F 2009/45562; G06F 9/45558; G06F 2009/45595; H04L 12/26; H04L 43/028; H04L 12/911; H04L 47/822
USPC ......................................................... 370/241
See application file for complete search history.

(56) References Cited

U.S. PATENT DOCUMENTS

| | | | |
|---|---|---|---|
| 8,448,238 B1 | 5/2013 | Gupta et al. | |
| 8,588,238 B2 | 11/2013 | Weill et al. | |
| 2011/0320632 A1 | 12/2011 | Karino | |
| 2013/0145375 A1* | 6/2013 | Kang ...................... | G06F 21/53 718/104 |
| 2013/0272181 A1* | 10/2013 | Fong ................... | H04W 72/044 370/311 |
| 2013/0276135 A1* | 10/2013 | Conklin ................ | G06F 21/554 726/27 |
| 2013/0294231 A1 | 11/2013 | Nodir et al. | |

(Continued)

FOREIGN PATENT DOCUMENTS

WO WO 2014106028 A1 * 7/2014 ......... H04L 63/0272

OTHER PUBLICATIONS

Tollet, Jerome, "Building Future Networks Based on SDN and NFV: Challenges, Benefits and the Key Role of Network Intelligence," Aug. 26, 2014, QOSMOS.

(Continued)

*Primary Examiner* — Edan Orgad
*Assistant Examiner* — Vanneilian Lalchinthang
(74) *Attorney, Agent, or Firm* — Hartman & Citrin LLC

(57) ABSTRACT

Concepts and technologies are disclosed herein for providing and using a deep packet inspection virtual function. A control system can detect a service request. The control system can analyze a policy to determine a function of a service to which the service request relates, a virtual machine that will host the function, and a deep packet inspection virtual function associated with the service. The control system can trigger loading of an image to the virtual machine and instantiation of the virtual machine. The image can include the function of the service and the deep packet inspection virtual function. The control system can validate the service and the deep packet inspection virtual function.

16 Claims, 10 Drawing Sheets

(56) References Cited

U.S. PATENT DOCUMENTS

| | | |
|---|---|---|
| 2014/0006585 A1 | 1/2014 | Dunbar et al. |
| 2014/0036921 A1* | 2/2014 | Hutt ................. H04L 49/25 370/392 |
| 2014/0188837 A1 | 7/2014 | Zhou et al. |
| 2014/0201374 A1 | 7/2014 | Ashwood-Smith et al. |
| 2014/0226478 A1* | 8/2014 | Manuguri ............. H04L 47/12 370/235 |
| 2014/0229630 A1 | 8/2014 | Narayanan et al. |
| 2014/0229945 A1 | 8/2014 | Barkai et al. |
| 2014/0233389 A1 | 8/2014 | Bantukul et al. |
| 2014/0241356 A1 | 8/2014 | Zhang et al. |
| 2014/0269716 A1 | 9/2014 | Pruss et al. |
| 2014/0280834 A1 | 9/2014 | Medved et al. |
| 2014/0280838 A1 | 9/2014 | Finn et al. |
| 2014/0317293 A1* | 10/2014 | Shatzkamer ........... G06F 9/455 709/226 |
| 2015/0006733 A1* | 1/2015 | Khan ................. H04L 47/70 709/226 |
| 2015/0016249 A1* | 1/2015 | Mukundan ........... H04L 47/125 370/230 |
| 2015/0222491 A1* | 8/2015 | Clark ................ H04L 45/48 370/256 |

OTHER PUBLICATIONS

Lin, Ying-Dar, "Research Roadmap Driven by Network Benchmarking Lab (NBL): Deep Packet Inspection, Traffic, Forensics, Embedded Benchmarking, Software Defined Networking and Beyond," International Journal of Networking and Computing, Jul. 2014, pp. 223-235, vol. 4, No. 2.

Yao et al., "An Evolutionary Approach Toward Virtualizing Packet Core," May 27, 2014, Cisco.

* cited by examiner

DEEP PACKET INSPECTION VIRTUAL FUNCTION

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which can allow flexibility in terms of scaling, locating, and/or using the services. Building services that were designed for deployment on dedicated infrastructure and instead deploying these same services in a virtualized infrastructure may not provide the benefits of using a virtualized network. Similarly, accommodating message routing between service components used to provide a virtualized service may require increased complexity of the virtualized service relative to services built on a dedicated infrastructure. Thus, while virtualization may provide flexibility to network operators and other entities, several challenges pose difficulties in migrating services to virtualized networks.

SUMMARY

The present disclosure is directed to a deep packet inspection virtual function. A computing device can host a control system, which can include multiple modules or applications that can be used to create, validate, and/or manage one or more deep packet inspection functions. The deep packet inspection function can be created as an application or service ("service") by the control system, as a component of the service, and/or as an independent function or application that can be chained to one or more services. Thus, the control system can chain the deep packet inspection function to other services or create the deep packet inspection function as part of the services. The deep packet inspection function also can be created as a standalone application, service, or component. The deep packet inspection function can include a deep packet inspection virtual switch and a deep packet inspection virtual function. The deep packet inspection virtual function can be created, modified, managed, and/or terminated by the service control and the deep packet inspection virtual switch can be created, modified, managed, and/or terminated by the network control. Traffic can be routed to the deep packet inspection function from various sources such as services, functions, or the like.

The control system can detect a request for a service or a request to configure or reconfigure a service. In some embodiments of creating or scaling services, the control system (or an operations management controller of the control system) can analyze one or more policies to determine how to create or scale the service. The control system can access a service creation database to identify one or more "recipes" that can be used to scale or create the service. The recipes can define service components including hardware, software, and/or transport as well as deep packet inspection functions and/or components of the deep packet inspection functions. The recipes also can define whether the deep packet inspection functions are to be created or scaled as a part of a service and/or if the deep packet inspection function is to be created or scaled as a standalone or independent deep packet inspection function.

The control system can access an inventory of resources to determine if resources needed to support the new service, the scaled service, and/or the embedded or standalone deep packet inspection function are available. The control system can identify a service control function that is to control the scaled or created service and/or the deep packet inspection function and allocate or create the service control function. The control system can, via an infrastructure control, instantiate one or more virtual machines and load and validate deep packet inspection functions components (e.g., deep packet inspection virtual functions and/or deep packet inspection virtual switches) and/or service components (e.g., virtual network functions and/or virtual service functions and the like) to the virtual machines.

According to various embodiments of the concepts and technologies described herein, the deep packet inspection function can be configured by configuration data. The configuration data can define how traffic or other data will be inspected by the deep packet inspection function as well as actions, if any, the deep packet inspection function should take with respect to the traffic and/or data flows. According to various embodiments, the deep packet inspection function can be configured by configuration data that can be obtained via one or more application programming interfaces ("APIs"). The configuration data can define actions to take with respect to traffic including, but not limited to, blocking traffic, forking traffic to additional or alternative destinations, reporting events to various devices, applying traffic shaping and/or quality of service ("QoS") functions to the traffic, modifying contents of the traffic, combinations thereof, or the like.

According to various embodiments, the deep packet inspection virtual function of a deep packet inspection function can create software defined networking ("SDN") configuration data that can be routed to a network control component of the control system (either directly or via a service control of the control system) by the deep packet inspection function. The SDN configuration data can be used by the network control to configure the deep packet inspection virtual switch. Thus, the deep packet inspection function can be configured via configuration data obtained via an API and/or can create configuration data that configures the deep packet inspection function.

According to one aspect of the concepts and technologies disclosed herein, a method is disclosed. The method can include detecting, at a control system that can include a processor, a service request that can include a request relating to a service. The method also can include analyzing, by the processor, a policy to determine a function of the service, a virtual machine that will host the function, and a deep packet inspection virtual function associated with the service. The method also can include triggering, by the processor, loading of an image to the virtual machine and instantiation of the virtual machine. The image can include the function of the service and the deep packet inspection virtual function. The method also can include validating, by the processor, the service and the deep packet inspection virtual function.

In some embodiments, triggering the loading of the image can include instructing an infrastructure control to load the image to the virtual machine and to request a network control to establish network transport between elements that will host the function and the deep packet inspection virtual function. In some embodiments, the network transport can include transport between a deep packet inspection function that can include the deep packet inspection virtual function and a service that can include the function. In some embodiments, the deep packet inspection virtual function is associated with a deep packet inspection function. In some embodiments, the deep packet inspection virtual function can receive deep packet inspection configuration data via a deep packet inspection virtual switch included in the deep packet inspection function and the deep packet inspection virtual function can be configured based upon the deep packet inspection configuration data.

In some embodiments, the deep packet inspection virtual function can generate software defined networking configuration data and can provide the software defined networking configuration data to a network control. The network control can configure the deep packet inspection virtual switch using the software defined networking configuration data. In some embodiments, the deep packet inspection function can receive traffic, analyze the software defined networking configuration data, and determine, based upon the software defined networking configuration data, if the traffic should be blocked.

In some embodiments, the method also can include analyzing the traffic if a determination is made that the traffic should not be blocked and taking an action based upon the analyzing and deep packet inspection configuration data. In some embodiments, the action can include one action selected from a group of actions that includes creating an event and routing the event to a recipient, modifying the traffic, storing a copy of the traffic, and forking the traffic. In some embodiments, the service request can include a request to create the service, while in some other embodiments the service request can include a request to scale the service.

According to another aspect of the concepts and technologies disclosed herein, a system is disclosed. The system can include a processor and a memory. The memory can store computer-executable instructions that, when executed by the processor, cause the processor to perform operations. The operations can include detecting a service request including a request relating to a service, analyzing a policy to identify a function of the service, a virtual machine that will host the function, and a deep packet inspection virtual function associated with the service, and triggering loading of an image to the virtual machine and instantiation of the virtual machine. The image can include the function of the service and the deep packet inspection virtual function. The operations also can include validating the service and the deep packet inspection virtual function.

In some embodiments, triggering the loading of the image can include instructing an infrastructure control to load the image to the virtual machine and to request a network control to establish network transport between elements that will host the function and the deep packet inspection virtual function. In some embodiments, the deep packet inspection virtual function can be associated with a deep packet inspection function that can include the deep packet inspection virtual function and a deep packet inspection virtual switch. The deep packet inspection virtual function can be configured based upon deep packet inspection configuration data that can be received at the deep packet inspection function via the deep packet inspection virtual switch.

In some embodiments, the deep packet inspection virtual function can generate software defined networking configuration data that can configure the deep packet inspection virtual switch. The deep packet inspection function can route the software defined networking configuration data to the deep packet inspection virtual switch via a network control. In some embodiments, the deep packet inspection virtual function can generate software defined networking configuration data that can configure the deep packet inspection virtual switch and the deep packet inspection function can route the software defined networking configuration data to the deep packet inspection virtual switch via a service control and a network control.

According to yet another aspect of the concepts and technologies disclosed herein, a computer storage medium is disclosed. The computer storage medium can have computer-executable instructions stored thereon that, when executed by a processor, cause the processor to perform operations. The operations can include detecting a service request that can include a request relating to a service, analyzing a policy to identify a function of the service, a virtual machine that will host the function, and a deep packet inspection virtual function associated with the service, and triggering loading of an image to the virtual machine and instantiation of the virtual machine. The image can include the function of the service and the deep packet inspection virtual function. The operations can further include validating the service and the deep packet inspection virtual function.

In some embodiments, triggering the loading of the image can include instructing an infrastructure control to load the image to the virtual machine and to request a network control to establish network transport between elements that will host the function and the deep packet inspection virtual function. In some embodiments, the deep packet inspection virtual function can be associated with a deep packet inspection function that can include the deep packet inspection virtual function and a deep packet inspection virtual switch. The deep packet inspection virtual function can be configured based upon deep packet inspection configuration data that can be received at the deep packet inspection function via the deep packet inspection virtual switch. In some embodiments, the deep packet inspection virtual function can generate software defined networking configuration data that can configure the deep packet inspection virtual switch. The deep packet inspection function can route the software defined networking configuration data to the deep packet inspection virtual switch via a network control.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
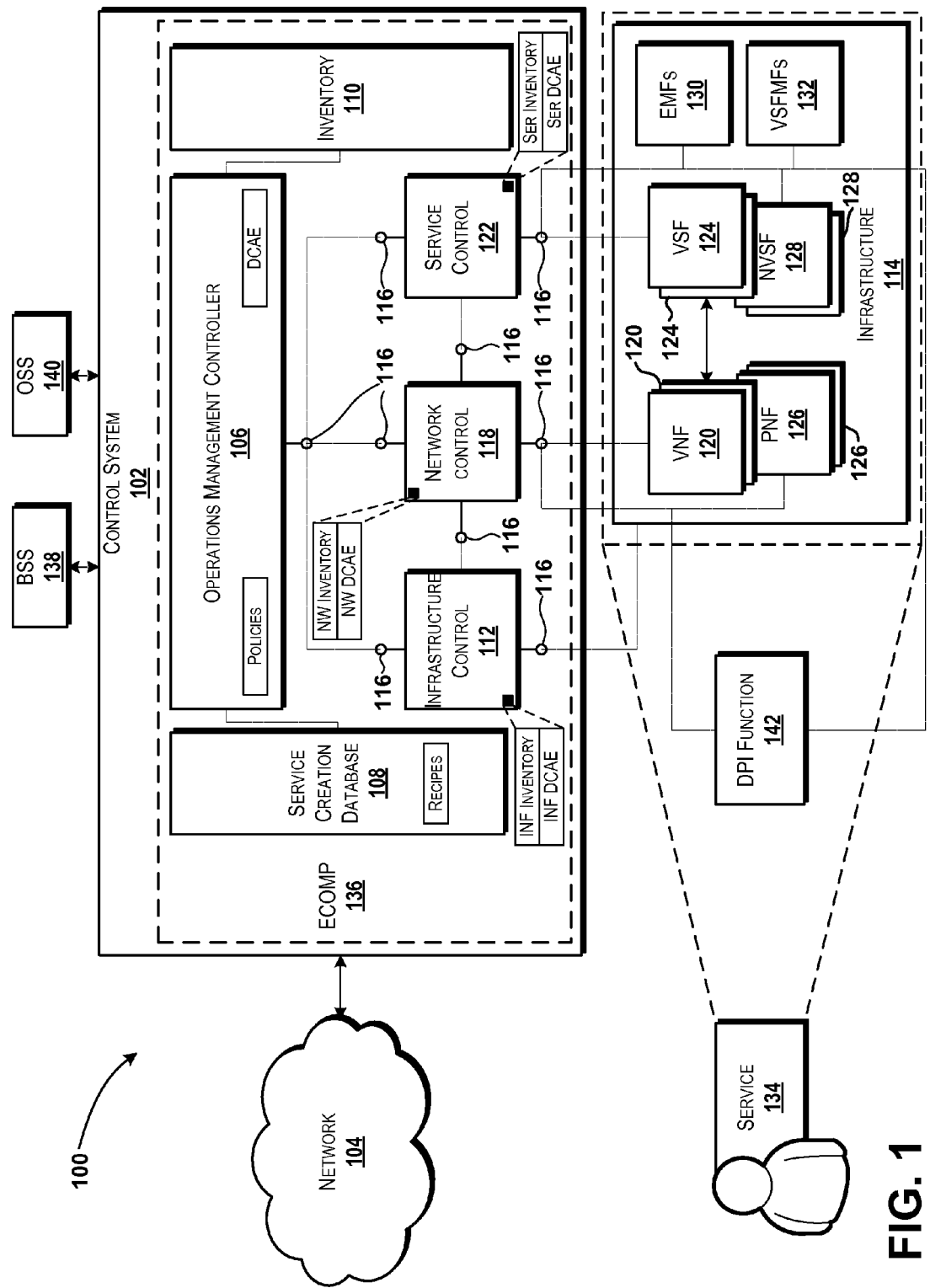
FIG. 1 is a system diagram illustrating an illustrative operating environment for various embodiments of the concepts and technologies described herein.

The following detailed description is directed to a deep packet inspection virtual function. A computing device can host a control system, which can include multiple modules or applications that can be used to create, validate, and/or manage one or more deep packet inspection functions. The deep packet inspection function can be created as an application or service ("service") by the control system, as a component of the service, and/or as an independent function or application that can be chained to one or more services. Thus, the control system can chain the deep packet inspection function to other services or create the deep packet inspection function as part of the services. The deep packet inspection function also can be created as a standalone application, service, or component. The deep packet inspection function can include a deep packet inspection virtual switch and a deep packet inspection virtual function. The deep packet inspection virtual function can be created, modified, managed, and/or terminated by the service control and the deep packet inspection virtual switch can be created, modified, managed, and/or terminated by the network control. Traffic can be routed to the deep packet inspection function from various sources such as services, functions, or the like.

The control system can detect a request for a service or a request to configure or reconfigure a service. In some embodiments of creating or scaling services, the control system (or an operations management controller of the control system) can analyze one or more policies to determine how to create or scale the service. The control system can access a service creation database to identify one or more "recipes" that can be used to scale or create the service. The recipes can define service components including hardware, software, and/or transport as well as deep packet inspection functions and/or components of the deep packet inspection functions. The recipes also can define whether the deep packet inspection functions are to be created or scaled as a part of a service and/or if the deep packet inspection function is to be created or scaled as a standalone or independent deep packet inspection function.

The control system can access an inventory of resources to determine if resources needed to support the new service, the scaled service, and/or the embedded or standalone deep packet inspection function are available. The control system can identify a service control function that is to control the scaled or created service and/or the deep packet inspection function and allocate or create the service control function. The control system can, via an infrastructure control, instantiate one or more virtual machines and load and validate deep packet inspection functions components (e.g., deep packet inspection virtual functions and/or deep packet inspection virtual switches) and/or service components (e.g., virtual network functions and/or virtual service functions and the like) to the virtual machines.

According to various embodiments of the concepts and technologies described herein, the deep packet inspection function can be configured by configuration data. The configuration data can define how traffic or other data will be inspected by the deep packet inspection function as well as actions, if any, the deep packet inspection function should take with respect to the traffic and/or data flows. According to various embodiments, the deep packet inspection function can be configured by configuration data that can be obtained via one or more application programming interfaces ("APIs"). The configuration data can define actions to take with respect to traffic including, but not limited to, blocking traffic, forking traffic to additional or alternative destinations, reporting events to various devices, applying traffic shaping and/or quality of service ("QoS") functions to the traffic, modifying contents of the traffic, combinations thereof, or the like.

According to various embodiments, the deep packet inspection virtual function of a deep packet inspection function can create software defined networking ("SDN") configuration data that can be routed to a network control component of the control system (either directly or via a service control of the control system) by the deep packet inspection function. The SDN configuration data can be used by the network control to configure the deep packet inspection virtual switch. Thus, the deep packet inspection function can be configured via configuration data obtained via an API and/or can create configuration data that configures the deep packet inspection function.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a deep packet inspection virtual function will be described, according to an illustrative embodiment. The operating environment 100 shown in FIG. 1 includes a computing device or system (hereinafter referred to as a "control system") 102. The control system 102 can host a network control framework. The control system 102 can operate on, in communication with, and/or as a part of a communications network ("network") 104. Additional aspects of the network 104 are illustrated and described below with reference to FIG. 9. Briefly, it should be understood that the network 104 can include almost any type of computer network as well as communications networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two or more similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The control system 102 can execute an operating system (not shown in FIG. 1) and one or more application programs, modules, or other computer-executable instructions that, when executed by a processor (not shown in FIG. 1) of the control system 102 can provide the functionality illustrated and described herein. The operating system can include a computer program for controlling the operation of the device, and the application programs, modules, or other computer-executable instructions can include executable programs configured to execute on top of the operating system to provide various functions as illustrated and described herein.

Although the control system 102 is illustrated and described in FIG. 1 as including multiple modules, components, and/or other elements, it should be understood that the functionality of these modules, components, and/or elements can be provided by application modules executed by a single device, in some embodiments. In some other embodiments, the functionality of the modules, components, and/or elements can be provided by multiple devices. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services, as well as creation, validation, and/or management of deep packet inspection elements as will be illustrated and described in further detail herein.

According to various embodiments of the concepts and technologies described herein, the operations management controller 106 can manage services and/or deep packet inspection elements across multiple "scopes" or "domains." As used herein, a scope, scope domain, and/or domain can be used to refer to aspects of the concepts and technologies described herein and can include, but are not necessarily limited to, an infrastructure scope, a network scope, and a service or application ("service") scope. The operations management controller 106 also can control and orchestrate service creation and management; validation of services and/or service components; as well as creation, management, and validation of deep packet inspection functionality as will be illustrated and described herein.

The operations management controller 106 can serve as a master service orchestrator ("MSO") for the control system 102. The operations management controller 106 can instantiate new services and/or deep packet inspection functions based upon "recipes" that can be stored in a service creation database 108 or elsewhere as illustrated and described herein. The operations management controller 106 also can use information stored in the inventory 110 when creating new services and/or deep packet inspection functions. As will be explained in more detail hereinbelow, services can include deep packet inspection functionality, in some embodiments, while in some other embodiments the deep packet inspection functionality can be embodied by standalone deep packet inspection functions that can be chained to services, located between services, and/or that can operate independently of other services. The operations management controller 106 also can instantiate scope control domain entities (e.g., controllers for infrastructure, network resources, and/or service functions), as will be explained in more detail below.

The operations management controller 106 can handle messages and/or exceptions that can be generated by the operations management controller 106 and/or exceptions that may be passed to the operations management controller 106 from the scope control domain (e.g., the controllers for the infrastructure, network resources, and/or the service functions) as will be illustrated and described below in more detail. In some embodiments, deep packet inspection functions can generate events and/or reports that can be routed to and/or handled by the operations management controller 106 or other entities, as will be illustrated and described in more detail below.

The operations management controller 106 also can run one or more high level data collection, analytics, and event handling ("DCAE") processes to analyze data or events relating to services, deep packet inspection functions, and/or the various components for managing the services, deep packet inspection functions, and/or their associated infrastructure, network, and service components. The operations management controller 106 also can run a policy decision function using a high level set of policies for service creation, control, and/or validation as well as deep packet inspection function creation, control, validation, and the like.

As mentioned above, the service creation database 108 can define products and services using definitions of components of services such as hardware, software, and/or transport that can be referred to herein as "recipes" or "service recipes." The recipes for services can define one or more deep packet inspection functions or function components, in some embodiments, while in some other embodiments the deep packet inspection functions and/or components can have deep packet inspection recipes that can be stored in the service creation database 108. The recipes can specify one or more components of a service and/or deep packet inspection function as well as processes or operations for putting the service and/or deep packet inspection function components together.

As such, it can be appreciated that the service and/or deep packet inspection function recipes may involve a service scope (e.g., a set of service or application functions), a network scope (e.g., a set of network functions and/or information indicating how network transport is to be established, maintained, and/or used), and an infrastructure scope (e.g., where on the network 104 or other hardware the network and service functions are to be located). The recipes also can implicitly or explicitly specify whether the various components of the service and/or deep packet inspection function should be chained together or if the components should operate independently of one another. It should be understood that the term "service" as used herein can include an "application." Thus, it should be understood that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or elsewhere. For example, in some embodiments the inventory 110 can reside and/or can be represented by an inventory and/or data structure that is hosted by the control system 102, the network 104, and/or elsewhere. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory 110 may be divided across the scope controllers (described in further detail below) so that each controller can have a local inventory that relates to that controller's scope. A controller for the infrastructure domain, for example, can maintain an infrastructure inventory. Similarly, controllers for network and service scopes can maintain scope-specific inventories. Even if scope-specific inventories are provided, the inventory 110 still can provide end-to-end viewing capability for a divided or distributed inventory embodiment, if desired. It should be understood that this example is illustrative and therefore should not be construed as being limiting in any way.

According to various embodiments, the operations management controller 106 can communicate with one or more infrastructure control elements or controllers (collectively referred to herein as "infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to some embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management application programming interface ("API") 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter collectively referred to as the "network control") 118 via a software defined networking ("SDN") API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below. The infrastructure control 112 also can load deep packet inspection functions to the VMs and/or can include deep packet inspection functionality in VM images that can be loaded to the VMs. These and other aspects of creating deep packet inspection functions will be explained in more detail below, particularly with reference to FIGS. 2-8.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter collectively referred to as the "service control") 122 to receive instructions for instantiating one or more virtual service functions ("VSFs") 124 within the infrastructure 114 as well as receive instructions for instantiating one or more deep packet inspection functions and/or deep packet inspection function components as will be illustrated and described in more detail below. A VSF 124 can include a virtualized application or application component, and can be used to create other services of various types including, but not limited to, basic services, segmented services, and/or composite services as will be illustrated and described in more detail herein. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service and/or deep packet inspection function. According to various embodiments, the transport network between one or more components of a service and/or deep packet inspection functions can be created by creating a group of one or more VNFs 120 within the infrastructure 114. The transport network also can include physical network functions ("PNFs") 126, which can be selected from an available inventory of physical resources, configured, and/or controlled by the network control 118.

The transport network can include various VNFs 120, PNFs 126, and/or other networking functions. The PNFs 126 can include, for example, European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions, which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or some infrastructure networking functions, if controlled or controllable by the network control 118. The network control 118 also can be instructed by the service control 122 and/or the operations management controller 106 to create, modify, and/or terminate one or more deep packet inspection components such as a deep packet inspection virtual switch (not shown in FIG. 1). The creation, configuration, and validation of the deep packet inspection virtual switch will be illustrated and described in more detail below, particularly with reference to FIGS. 2-8. These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118), or the like, can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with the service control 122. The service control 122 can be responsible for management, deployment, operation, and coordination of services. Services can be provided by and/or can include one or more VSFs 124, non-virtualized service functions ("NVSFs") 128, one or more EMFs 130, one or more VSF management functions (labeled "VSFMFs" in FIG. 1) 132, combinations thereof, or the like.

According to various embodiments, the services, service components, deep packet inspection functions, and/or deep packet inspection function components can be created by the service control 122 by creating a group of one or more VSFs 124, NVSFs 128, and/or deep packet inspection virtual functions (not shown in FIG. 1) within the infrastructure 114. Thus, it should be understood that the NVSFs 128 can be created and/or controlled by the service control 122. It also should be understood that the operations management controller 106 can create or prompt creation of the VSFs 124 and initiate requests to the infrastructure 114 and network control 118. As such, it should be understood that the operations management controller 106 and/or the service control 122 can create a service, and/or a deep packet inspection virtual function, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128; as well as deep packet inspection functions and/or deep packet inspection function components as will be illustrated and described in more detail below with reference to FIG. 2. The service control 122 also can handle service scope exceptions, in some embodiments. As noted above, the operations management controller 106 also can create services, service components, service functions, deep packet inspection functions, and/or deep packet inspection function components depending upon the degree to which the operations management controller 106 delegates control to the service control 122. It should be understood that these example components of the service control 122 are illustrative and therefore should not be construed as being limiting in any way.

The service control 122 can be responsible for management and control of services, components or functions of the services, deep packet inspection functions, and/or components of the deep packet inspection functions. According to various embodiments, the service control 122 can manage VSFs 124 and/or NVSFs 128 of services being controlled as well as components of the deep packet inspection functions illustrated and described herein. The service control 122 also can handle service EMFs, which can manage FCAPS for services being controlled. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like, as well as to create, modify, and/or terminate one or more deep packet inspection functions and/or deep packet inspection function components. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service-related transport and/or deep packet inspection function transport (e.g., transport between service functions, service control functions, deep packet inspection functions, and/or deep packet inspection function components). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 the NVSFs 128, the EMFs 130, the VSF management functions 132, and/or combinations thereof, the control system 102 can create a service 134 on the infrastructure 114. It should be understood that this example is illustrative and therefore should not be construed as being limiting in any way.

According to various embodiments, the control system 102 can integrate an enhanced control, orchestration, management, and policy framework (hereinafter referred to as "ECOMP") 136, which can be integrated into the control system 102. The ECOMP 136 can enable rapid service creation by combining pre-built components and/or functions. The ECOMP 136 also can enable dynamically elastic capacity management by enabling scaling and instantiation. The ECOMP 136 also can support control functions. The control functions can be driven by real-time analytics and policy decisions.

The ECOMP 136 also can support unified operations, administration, and management across the three scopes (e.g., infrastructure, network, and service). The ECOMP 136 also can support optimization of deep packet inspection functions and/or services 134 and/or the components of the deep packet inspection functions and/or services 134, analytics of the deep packet inspection functions and/or the services 134, components thereof, and/or the various components of the control system 102. As illustrated and described in the FIGURES, the ECOMP 136 can be an element of the control system 102, in some embodiments, while in other embodiments the control system 102 can correspond to an embodiment of the ECOMP 136. It should be understood that these examples are illustrative and therefore should not be construed as being limiting in any way.

The ECOMP 136 can include a service design and creation ("SDC") environment, an active and available inventory ("AAI"), an operations management framework ("OMF"), and/or a service, infrastructure, and/or network control. Thus, the ECOMP 136 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 136 can enable developers, service designers, network planners/engineers, operations planners and product managers, other entities, or the like, to create, organize, prototype, and deploy services 134. In some embodiments, service definitions can be instantiated by the OMF and the resulting service instances can be recorded in the AAI. According to various embodiments, components associated with a service 134 can be created in the SDC component and stored as recipes. Thus, the SDC component can store recipes for VSF components, VSFs 124, service components, deep packet inspection functions, deep packet inspection function components, and various network and/or infrastructure resources. The recipes also can indicate whether or not various components of the deep packet inspection functions and/or the services 134 are to be chained together or are to operate independently of one another. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 138 and one or more operations support system ("OSS") 140. The BSS 138 and the OSS 140 can be external to the ECOMP 136, in some embodiments. The BSS 138 and the OSS 140 can interact with customers and operations in support of activities and aggregate capabilities across services within and outside of the operating environment 100.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 136 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

As shown in FIG. 1, the control system 102 also can be used to create, validate, and/or manage one or more deep packet inspection functions 142. The deep packet inspection function 142 can be created as a service 134 by the control system 102, as a component of the service 134, and/or as an independent function or application as illustrated and described herein. The control system 102 can be configured to chain the deep packet inspection function 142 to other services 134, in some embodiments, or to create the deep packet inspection function 142 as part of a service 134. In various embodiments, the deep packet inspection function 142 can be created as a standalone application, service, or component that can provide the functionality illustrated and described herein for providing deep packet inspection in a virtualized environment.

Figure 2:
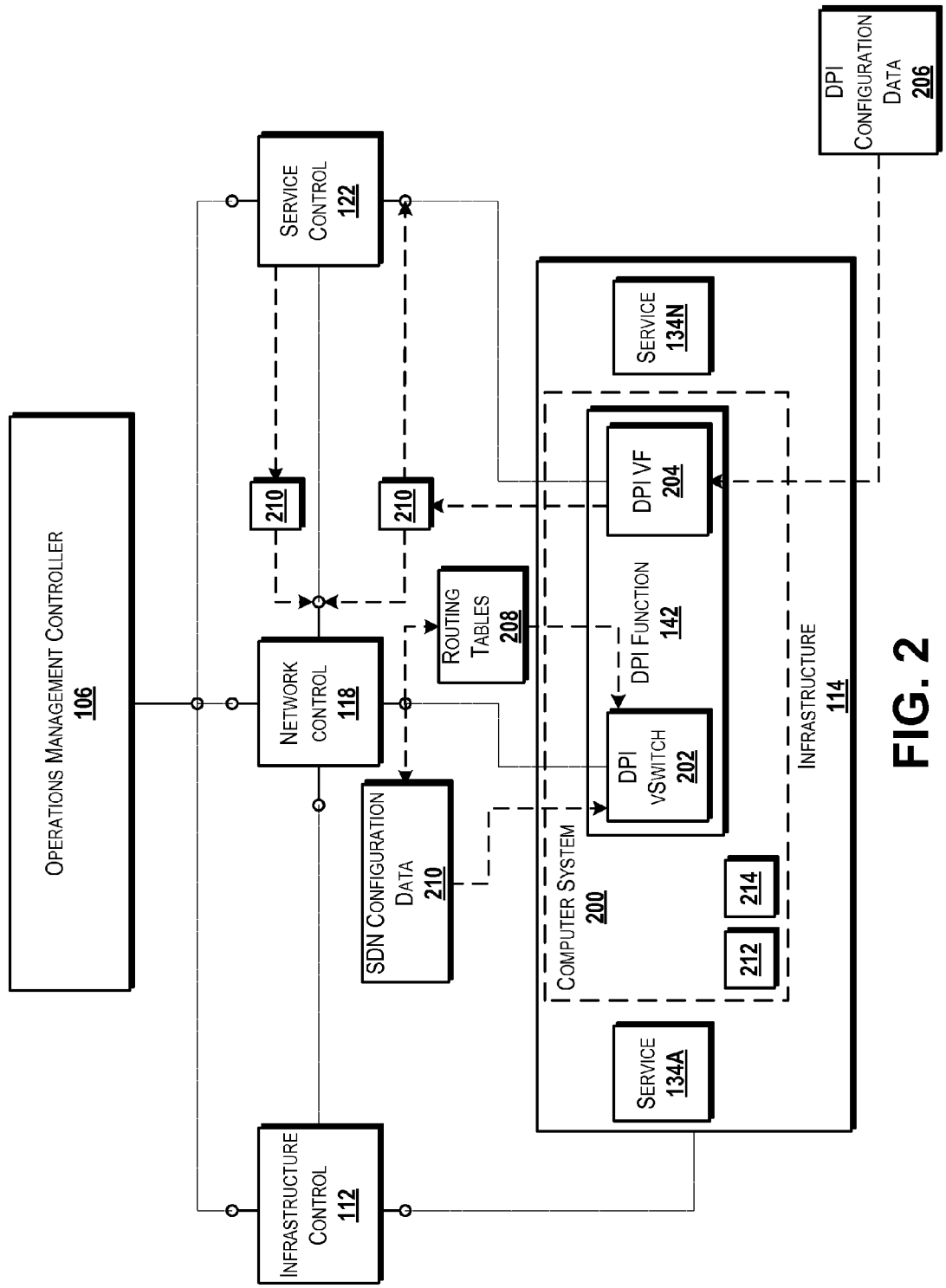
FIG. 2 is a system diagram illustrating additional aspects of various embodiments of the concepts and technologies described herein.

The components of the deep packet inspection function 142 will be illustrated and described in more detail herein, particularly with reference to FIG. 2. Briefly, however, the deep packet inspection function 142 can include a deep packet inspection virtual switch and a deep packet inspection virtual function. According to various embodiments, the deep packet inspection virtual function can be created, modified, managed, and/or terminated by the service control 122 and the deep packet inspection virtual switch can be created, modified, managed, and/or terminated by the network control 118 and/or by the service control 122 via the network control 118. The configuration of these and other components of the deep packet inspection function 142 will be illustrated and described in more detail below.

According to various embodiments of the concepts and technologies described herein, the deep packet inspection function 142 can operate independently. Thus, traffic can be routed to the deep packet inspection function 142 from various sources such as the service 134, other services, or the like. In some other embodiments, the deep packet inspection function 142 can be created as a component of the service 134 and as such, the functionality of the deep packet inspection function 142 can be embedded within the service 134. In yet other embodiments, the deep packet inspection function 142 can be located between multiple services 134. These and other embodiments will be illustrated and described in more detail below.

In practice, the operations management controller 106 can detect a request for a service 134. According to various embodiments, the operations management controller 106 can detect a request to configure or reconfigure a service 134 or a request for a new service 134. In some embodiments of creating or scaling services 134, the operations management controller 106 can analyze one or more policies to determine how the scaling or creation of the service 134 should be handled. The operations management controller 106 also can access the service creation database 108 to identify one or more "recipes" that can be used to scale or create the service 134. The recipes can define service components including hardware, software, and/or transport as well as deep packet inspection functions 142 and/or components of the deep packet inspection functions 142. The recipes also can define whether the deep packet inspection functions 142 are to be created or scaled as a part of a service 134 and/or if the deep packet inspection function 142 is to be created or scaled as a standalone or independent deep packet inspection function 142.

The operations management controller 106 can access the inventory 110 to determine if the resources needed to support the new service 134, the scaled service 134, and/or the embedded or standalone deep packet inspection function 142 are available for use. The operations management controller 106 also can identify a service control function that is to control the scaled or created service 134 and allocate or create the service control function. Thus, the operations management controller 106 can select, allocate, and/or create the service control function that is to control the service 134 and/or the deep packet inspection function 142.

The operations management controller 106 can instruct the infrastructure control 112 to instantiate one or more VMs and to load and validate deep packet inspection functions components (e.g., deep packet inspection virtual functions and/or deep packet inspection virtual switches); VNFs 120; and/or VSFs 124 to the VMs. It should be understood that if the service 134 and/or deep packet inspection functions 142 are being scaled, that the infrastructure control 112 may de-allocate deep packet inspection virtual functions, deep packet inspection virtual switches, VMs, VNFs 120, and/or VSFs 124 instead of instantiating the deep packet inspection virtual functions, deep packet inspection virtual switches, VMs, VNFs 120, and/or VSFs 124. The infrastructure control 112 can also instruct the network control 118 to create or establish transport between the components of the deep packet inspection function 142 and/or the VMs, the VNFs 120, the VSFs 124, and/or the service control 122. In the case of scaled down services 134, it can be appreciated that the network control may de-allocate or tear down transport. The network control 118 can report events to the network DCAE and/or update the network inventory (and/or the inventory 110).

The service control 122 can receive instructions from the operations management controller 106 to instantiate or tear down one or more deep packet inspection virtual functions, in some embodiments. The service control 122 can report an event to a service DCAE and update the service inventory (and/or the inventory 110). The network control 118 also can receive instructions to establish transport between the new deep packet inspection virtual functions and/or the VSFs 124 and report events to the network DCAE for scaled up services 134 and/or can tear down network transport supporting deep packet inspection virtual functions and/or the VSFs 124 and report events to the network DCAE for scaled down services 134. The network control 118 can establish transport using VNFs 120 and/or PNFs 126. The operations management controller 106 can validate the deep packet inspection function 142 and/or the service 134 end-to-end and/or update the inventory 110.

According to various embodiments of the concepts and technologies described herein, the deep packet inspection function 142 can be configured by configuration data. The configuration data can define how traffic or other data will be inspected by the deep packet inspection function 142 as well as actions, if any, to take with respect to the traffic and/or data flows. According to various embodiments, the deep packet inspection function 142 can be configured by configuration data that can be obtained via one or more APIs. The configuration data can define actions to take with respect to traffic including, but not limited to, blocking traffic, forking traffic to additional or alternative destinations, reporting events to various devices, applying traffic shaping and/or QoS functions to the traffic, modifying contents of the traffic, combinations thereof, or the like.

According to various embodiments, the deep packet inspection virtual function of a deep packet inspection function 142 can create SDN configuration data that can be routed to the network control 118 (either directly or via the service control 122) by the deep packet inspection function 142. The SDN configuration data can be used by the network control 118 to configure the deep packet inspection virtual switch, as will be illustrated and described in more detail below with reference to FIG. 2. Thus, the deep packet inspection function 142 can be configured via configuration data obtained via an API and/or can create configuration data that configures the deep packet inspection function 142. These and other aspects of the deep packet inspection functions 142 will be illustrated and described in more detail below.

FIG. 1 illustrates one control system 102, one network 104, one operations management controller 106, one service creation database 108, one inventory 110, one infrastructure control 112, one instance of infrastructure 114, one network control 118, one service control 122, one service 134, one ECOMP 136, one BSS 138, one OSS 140, and one deep packet inspection function 142. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 134; zero, one, or more than one ECOMP 136; zero, one, or more than one BSS 138; zero, one, or more than one OSS 140; and/or zero, one, or more than one deep packet inspection functions 142. As such, the illustrated embodiment should be understood as being illustrative, and should not be construed as being limiting in any way.

Turning now to FIG. 2, additional aspects of the deep packet inspection function 142 are illustrated and described in detail. In particular, FIG. 2 shows the deep packet inspection function 142 operating on the infrastructure 114. According to some embodiments, as shown in FIG. 2, the deep packet inspection function 142 can be hosted and/or executed by a computer system 200. Although multiple services 134A-N (hereinafter collectively and/or generically referred to as "services 134") are shown as being executed and/or hosted by the same infrastructure 114 that hosts or includes the computer system 200, this is not necessarily the case. In particular, the services 134 and/or the deep packet inspection functions 142 can be hosted and/or executed by different devices and/or infrastructure 114 in various embodiments. As such, the illustrated embodiment should be understood as being illustrative and therefore should not be construed as being limiting in any way.

The deep packet inspection function 142 can include multiple components, in some embodiments, as explained above and as shown. In particular, the deep packet inspection function 142 can include a deep packet inspection virtual switch (labeled "DPI vSwitch" in FIG. 2) 202 and a deep packet inspection virtual function (labeled "DPI VF" in FIG. 2) 204. The deep packet inspection function 142 also can be configured by way of the deep packet inspection configuration data 206, as mentioned above. The deep packet inspection virtual switch 202, the deep packet inspection virtual function 204, and the deep packet inspection configuration data 206 will be described in additional detail below, as will other elements shown in FIG. 2.

As mentioned above, the deep packet inspection virtual switch 202 can be created and/or controlled by one or more network control functions, which can be included in the network control 118 illustrated and described above with reference to FIG. 1. The deep packet inspection virtual switch 202 can perform inspection and action at the transport layer. Thus, the deep packet inspection virtual switch 202 can block traffic or other data flows. The deep packet inspection virtual switch 202 also can be configured to route or fork the traffic and/or packets thereof based upon one or more routing tables 208, which can be provided to the deep packet inspection virtual switch 202 by a network control function of the network control 118. It can be appreciated from the above description of the control system 102 that the deep packet inspection virtual switch 202 can be instantiated by the operations management controller 106 or other entities, according to various embodiments.

According to various embodiments of the concepts and technologies described herein, the deep packet inspection virtual switch 202 can be configured by SDN configuration data 210. The SDN configuration data 210 can be forwarded to the deep packet inspection virtual switch 202 by the network control 118. In some embodiments, the SDN configuration data 210 can be generated by the deep packet inspection virtual function 204, as will be explained below, and routed to the network control 118 by the deep packet inspection virtual function 204 directly and/or via the service control 122, as shown in FIG. 2. Thus, the deep packet inspection virtual function 204 can tailor functionality of the deep packet inspection virtual switch 202 via the SDN configuration data 210 in some embodiments. It should be understood that this example is illustrative and therefore should not be construed as being limiting in any way.

The deep packet inspection virtual function 204 can provide inspection, analysis, and action at the application or service layer for traffic that arrives at the deep packet inspection function 142. Actions that can be taken by the deep packet inspection virtual function 204 with respect to the traffic can include, but are not limited to, storing packets for analysis, modifying content of the packets, creating and distributing reports or events relating to the traffic, or the like.

As mentioned above, the deep packet inspection virtual function 204 also can be configured to generate the SDN configuration data 210. The deep packet inspection virtual function 204 therefore can instruct a network control function of the network control 118 to configure the deep packet inspection virtual switch 202 by way of the SDN configuration data 210. Thus, the deep packet inspection virtual function 204 can instruct the network control function to configure the deep packet inspection virtual switch 202 to route or fork packets. In some embodiments, the deep packet inspection virtual function 204 can provide the SDN configuration data 210 directly to the network control 118 while in some other embodiments, the deep packet inspection virtual function 204 can provide the SDN configuration data 210 to the service control 122 for routing to the network control 118. Both embodiments are shown in FIG. 2.

Thus, the deep packet inspection configuration data 206 can be used to define how the deep packet inspection function 142 will inspect traffic or other data at the deep packet inspection function 142. The deep packet inspection configuration data 206 can include instructions that can describe what packets will be inspected by the deep packet inspection function 142, what actions will be taken with respect to the traffic, whether or not reports or events are to be generated by the deep packet inspection function 142, combinations thereof, or the like. The deep packet inspection configuration data 206 can be provided to the deep packet inspection function 142 via an application programming interface ("API") exposed by the deep packet inspection virtual function 204, a system that executes or hosts the deep packet inspection function 142, other devices, combinations thereof, or the like. In some embodiments, the deep packet inspection configuration data 206 can be received via a deep packet inspection application programming interface (not shown in FIG. 2) and therefore can be configured remotely. It should be understood that this example is illustrative and therefore should not be construed as being limiting in any way.

Thus, it can be appreciated that the deep packet inspection function 142 can be configured to inspect traffic or other data flows that flow into the deep packet inspection function 142. According to various embodiments of the concepts and technologies described herein, the deep packet inspection function 142 can inspect the traffic based upon a set of configuration data, illustrated and described herein as deep packet inspection configuration data 206. The deep packet inspection function 142 can perform actions based upon the deep packet inspection configuration data 206. In particular, then actions can include, but are not limited to, blocking the traffic, forking the traffic to one or more locations, reporting an event to one or more devices, applying quality of service and/or traffic shaping functions to the traffic, modifying contents of the traffic (e.g., headers, payload, or both), combinations thereof, or the like.

As shown in FIG. 2, the deep packet inspection function 142 and/or the infrastructure 114 that hosts the deep packet inspection function 142 can be hosted or executed by the computer system 200. The computer system 200 can include a memory 212 and a processor 214. The computer system 200 can, via execution of computer-executable instructions stored in the memory 212 by the processor 214, provide the functionality illustrated and described herein with reference to the deep packet inspection function 142. Various methods or processes associated with the deep packet inspection function 142 are illustrated and described herein, particularly with reference to FIGS. 4-8. An example architecture of the computer system 200 is illustrated and described herein with reference to FIG. 10. It should be understood that these examples are illustrative and therefore should not be construed as being limiting in any way.

Figure 3:
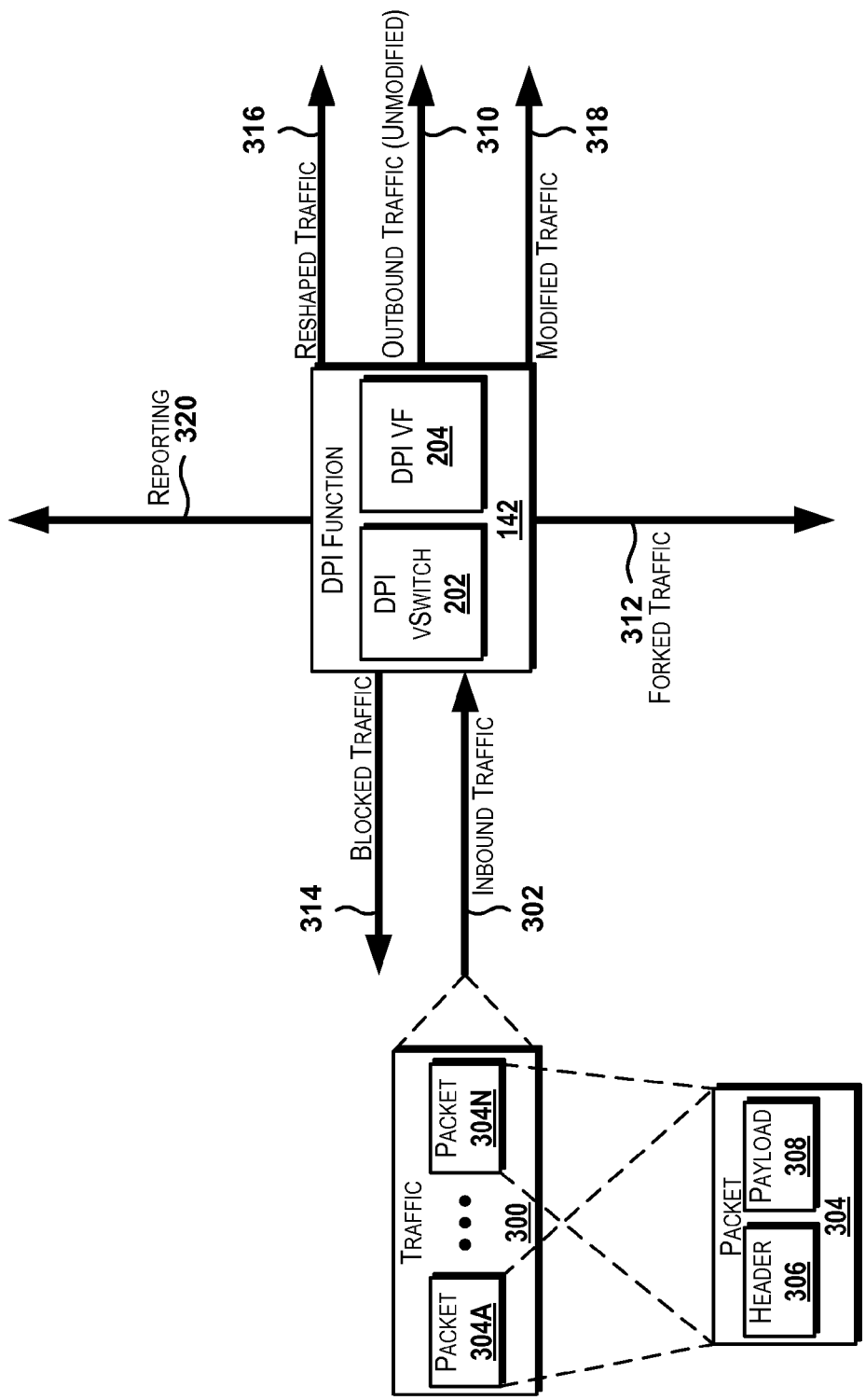
FIG. 3 is a system diagram illustrating additional aspects of deep packet inspection according to various embodiments of the concepts and technologies described herein.

As shown in FIG. 3, the deep packet inspection function 142 can be deployed as a standalone service, application, module, or entity instead of, or in addition to, being deployed as an embedded function within other services 134. In some embodiments, the deep packet inspection function 142 can be integrated and/or tightly coupled to one or more services 134, e.g., the deep packet inspection function 142 can be fully integrated into an existing VF or can be created as a separate VF that can be tightly coupled to other VFs of a service 134.

In some other embodiments, as illustrated and described herein, the deep packet inspection function 142 can be created as a standalone VF that can be chained to one or more services 134 on demand (e.g., when a parent orders parental controls, when a service provider enables filtering, for enabling probes, etc.). As used herein, a "tightly coupled" deep packet inspection function 142 may be highly integrated with service 134 to which the deep packet inspection function 142 is tightly coupled but cannot be reused for other services 134, while a standalone deep packet inspection function 142 may not be integral to a service 134 but can be chained to a service 134 and reused for other services 134.

According to various embodiments, the deep packet inspection function 142 illustrated and described herein is a standalone function. Thus, the deep packet inspection function 142 has its own service control function and can be chained to other services 134 by the MSO, if desired. According to various embodiments, the deep packet inspection function 142 can be chained to services 134 by inserting the deep packet inspection function 142 between an (N-1)th service 134(N-1) and an Nth service 134N. According to various embodiments, the operations management controller 106 (which can include functionality associated with an MSO in various embodiments) can insert the deep packet inspection function 142 between the two or more services using an SDN controlled switch such as the deep packet inspection virtual switch 202.

The deep packet inspection configuration data 206 can be provided to the deep packet inspection virtual function 204 through an application programming interface from a virtual function that may not be a part of a service 134 (or services 134) to which the deep packet inspection function 142 is chained. In some embodiments, the deep packet inspection configuration data 206 can be provided to the deep packet inspection virtual function 204 via one or more virtual functions of the services 134 to which the deep packet inspection function 142 is chained. It should be understood that this example is illustrative and therefore should not be construed as being limiting in any way.

In one embodiment of the concepts and technologies described herein, the deep packet inspection function 142 can be placed between the EPC and the IMS for the purpose of inspecting SIP messages. Thus, the services 134 in this example are the EPC and the IMS. The deep packet inspection configuration data 206 can be provided by a virtual network function and/or by the IMS. It should be understood that this example is illustrative and therefore should not be construed as being limiting in any way.

In another embodiment of the concepts and technologies described herein, the deep packet inspection function 142 can be placed at an egress point of the EPC. The deep packet inspection function 142 can be configured to inspect user data such as search strings, or the like. The deep packet inspection function 142 can be separate from the EPC and/or can be chained to the EPC. The deep packet inspection configuration data 206 can originate from a virtual network function that is not a part of the EPC. It should be understood that the deep packet inspection function 142 can be chained to a single service 134 as in this example (where the deep packet inspection function 142 is chained to an exit point of the network 104) though there may be another service 134 to which forked traffic and/or events are routed. It should be understood that these examples are illustrative and therefore should not be construed as being limiting in any way.

Turning now to FIG. 3, additional aspects of a deep packet inspection function 142 are illustrated and described in detail. In particular, FIG. 3 illustrates various traffic patterns that can be supported by the deep packet inspection function 142, according to various embodiments of the concepts and technologies described herein. As illustrated and described above with reference to FIG. 2, the deep packet inspection function 142 can be located in proximity to one service 134, in proximity to two or more services 134, in proximity to or within a traffic flow path that leads to one service 134, in proximity to or within a traffic flow path that leads from one service 134, in proximity to or within a traffic flow path that leads to two or more services 134, and/or in proximity to or within a traffic flow path between two or more services 134. As such, it should be understood that this example is illustrative and therefore should not be construed as being limiting in any way.

As shown in FIG. 3, traffic 300 can arrive at the deep packet inspection function 142 via an inbound traffic path 302, which can correspond to a path along which traffic flows to the deep packet inspection function 142. The inbound traffic 300 can correspond to a data flow, a traffic flow, and/or other strings or sets of data packets 304A-N (hereinafter collectively and/or generically referred to as "data packets 304"). One or more of the data packets 304 can include a header 306 and a payload 308, which can include the content of the data packet 304.

In some embodiments, the deep packet inspection function 142 can be configured to allow the traffic 300 to pass through the deep packet inspection function 142 without any other operations or activities. In some other embodiments, the deep packet inspection function 142 can perform various operations or activities on the traffic 300, as will be explained below, and allow the traffic 300 to exit the deep packet inspection function 142. Regardless of whether or not other functions, operations, or activities are taken with respect to the traffic 300, the deep packet inspection function 142 can allow the traffic 300 to exit the deep packet inspection function 142 along an outbound traffic path 310, which can correspond to a path along which outbound traffic flows away from the deep packet inspection function 142. Although not shown with respect to other paths illustrated in FIG. 3, it should be understood that the traffic 300 can exit the deep packet inspection function 142 as a stream or set of data packets 304 as illustrated with respect to the traffic 300 arriving at the deep packet inspection function 142. It should be understood that this example is illustrative and therefore should not be construed as being limiting in any way.

As noted above, the deep packet inspection function 142 can complete various functions, operations, or activities with respect to the traffic 300. In particular, the deep packet inspection function 142 can create a fork in the traffic 300. In particular, the deep packet inspection function 142 can replicate the inbound traffic 300 to obtain a copy of the traffic 300 in addition to the original traffic 300. One of the original traffic 300 or the copy of the traffic 300 can be routed out of the deep packet inspection function 142 along the outbound traffic path 310, while the other of the original traffic 300 or the copy of the traffic 300 can be routed out of the deep packet inspection function 142 along the forked traffic path 312.

In some other embodiments, the deep packet inspection function 142 can be configured to block the traffic 300. If the deep packet inspection function determines that traffic 300 is to be blocked, the traffic 300 can be returned to a source of the traffic 300, deleted, or otherwise impeded from proceeding through the deep packet inspection function 142. In FIG. 3, the traffic 300 is shown being returned to a sender along a blocked traffic path 314. It should be understood that this example is illustrative and therefore should not be construed as being limiting in any way.

In some other embodiments, the deep packet inspection function 142 can be configured to reshape the traffic 300 before allowing the traffic 300 to exit the deep packet inspection function 142. If the deep packet inspection function determines that traffic 300 is to be reshaped, the traffic 300 can be reshaped and routed out of the deep packet inspection function 142 along the outbound traffic path 310 or the reshaped traffic path 316. As used herein, "shaping" when used to refer to traffic 300, can include applying or affecting a quality of service attribute or parameter to or of the traffic 300 or affecting the flow of the traffic 300 in some way, for example by delaying the traffic 300 and/or creating gaps or pauses between packets 304 of the traffic 300. It should be understood that this example is illustrative and therefore should not be construed as being limiting in any way.

In some other embodiments, the deep packet inspection function 142 can be configured to modify the traffic 300 before allowing the traffic 300 to exit the deep packet inspection function 142. In some embodiments, for example, the deep packet inspection function 142 can modify headers 306 of the traffic 300, payloads 308 of the traffic 300, or the like. If the deep packet inspection function 142 determines that traffic 300 is to be modified, the traffic 300 can be modified and routed out of the deep packet inspection function 142 along the outbound traffic path 310 or the modified traffic path 318. It should be understood that this example is illustrative and therefore should not be construed as being limiting in any way.

In some embodiments, the deep packet inspection function 142 can be configured to report events to various entities. For example, the deep packet inspection function 142 can create and/or distribute one or more events to various recipients along a reporting path 320. According to various embodiments, the events and/or reports can be transmitted to various recipients for alarming, analysis, logging, or other purposes. It should be understood that these examples are illustrative and therefore should not be construed as being limiting in any way.

Figure 4:
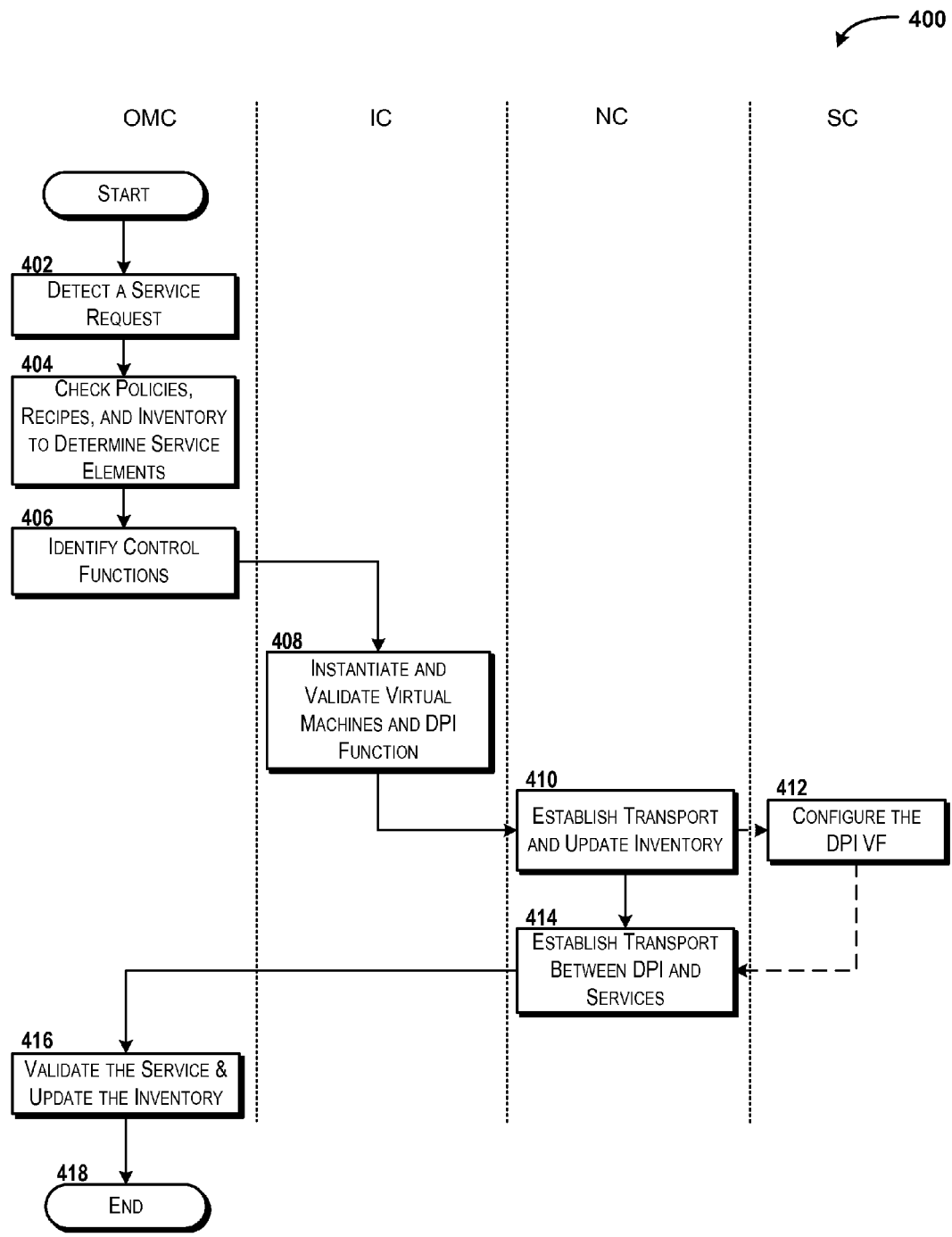
FIG. 4 is a flow diagram showing aspects of a method for instantiating a deep packet inspection function, according to an illustrative embodiment of the concepts and technologies described herein.

Turning now to FIG. 4, aspects of a method 400 for instantiating a deep packet inspection function 142 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 or the computer system 200, to perform one or more operations and/or causing the processor to direct other components of the computing system or device to perform one or more of the operations.

For purposes of illustrating and describing the concepts of the present disclosure, the methods disclosed herein are described as being performed by the control system 102 or the computer system 200 via execution of one or more software modules such as, for example, the modules illustrated and described in FIGS. 1-2 including, but not limited to, the operations management controller 106, the infrastructure control 112, the network control 118, the service control 122, and/or the deep packet inspection function 142. It should be understood that additional and/or alternative devices and/or network nodes can provide the functionality described herein via execution of one or more modules, applications, and/or other software including, but not limited to, the modules shown in FIGS. 1-2. Furthermore, although the particular modules are mentioned as being capable of providing the disclosed operations, it should be understood that the illustrated embodiments are illustrative, and should not be viewed as being limiting in any way.

The method 400 begins at operation 402. At operation 402, the control system 102 can detect a service request. The service request can include a request relating to a service 134. Thus, the service request can correspond to an order for a new service 134, a request to instantiate a new service 134, a request to scale a service 134, a request to terminate a service 134, or the like. It should be understood that the control system 102 can detect the request in operation 402 or receive the request. In the embodiment shown in FIG. 4, the service request detected in operation 402 can correspond to a request to create the new service 134. In response to the service request (or detecting the service request), the control system 102 can begin operations as illustrated and described herein. In some embodiments, the control system 102 can perform operation 402 by executing the operations management controller 106 and/or functionality associated with the operations management controller 106 as illustrated in FIG. 4. It should be understood that this example is illustrative and therefore should not be construed as being limiting in any way.

From operation 402, the method 400 proceeds to operation 404. At operation 404, the control system 102 can check one or more policies, recipes, and/or inventory to determine service elements to include in a service 134 that is responsive to the service request detected in operation 402. Thus, the control system 102 can determine or identify one or more functions that the service 134 will provide and determine, based upon the determined or identified functions, one or more service elements. At operation 404, the control system 102 also can check one or more policy rules to determine how a service 134 should be created and/or various features, requirements, architecture, resources, and/or operational framework associated with such a service 134.

According to various embodiments of the concepts and technologies described herein, operation 404 can include determining that a deep packet inspection function 142 is to be created as part of the service 134 and/or that a deep packet inspection function 142 is to be tied to the service 134. In some embodiments, the control system 102 can perform operation 404 by executing the operations management controller 106 and/or functionality associated with the operations management controller 106 as illustrated in FIG. 4. It should be understood that this example is illustrative and therefore should not be construed as being limiting in any way.

From operation 404, the method 400 proceeds to operation 406. At operation 406, the control system 102 can identify an infrastructure control function, a network control function, and/or a service control function for the service 134 that is requested by way of the service request received or detected in operation 402. According to various embodiments of the concepts and technologies described herein, the control system 102 can select an appropriate infrastructure control function, network control function, and/or service control function from any number of existing control functions to control the service 134 and/or various service functions associated with the service 134.

In some other embodiments, the control system 102 may determine that the appropriate service control function does not exist and, in response to making such a determination, can create the service control function that will control the service 134. Thus, it should be understood that in addition to designating or selecting an infrastructure control function, network control function, and a service control function, operation 406 can include creating and/or allocating a service control function. In some embodiments, the control system 102 can perform operation 406 by executing the operations management controller 106 and/or functionality associated with the operations management controller 106 as illustrated in FIG. 4. It should be understood that this example is illustrative and therefore should not be construed as being limiting in any way.

From operation 406, the method 400 proceeds to operation 408. At operation 408, the control system 102 can instantiate and validate one or more virtual machines associated with the service 134 and one or more deep packet inspection functions 142. According to some embodiments, the service 134 created by way of the method 400 can include an embedded or standalone deep packet inspection function 142 as noted above. As such, the virtual machines instantiated in operation 408 can include an embedded or standalone deep packet inspection function 142 and/or one or more components thereof such as a deep packet inspection virtual switch 202 and/or a deep packet inspection virtual function 204 if requested or instructed by an entity such as the operations management controller 106.

According to various embodiments of the concepts and technologies described herein, the instantiation of the deep packet inspection function 142 can be completed by one or more of the infrastructure control 112, the network control 118, and/or the service control 122. Thus, while FIG. 4 shows the instantiation of the deep packet inspection function 142 at the infrastructure control 112, it should be understood that this embodiment is one example and should not be construed as being limiting in any way. In particular, in some embodiments the infrastructure control 112 can instantiate one or more virtual machines and load images to the virtual machines where the images can include components of the service 134 and components of the deep packet inspection function 142.

In some embodiments, a recipe for a service 134 and/or a deep packet inspection function 142 embedded in and/or associated with a service 134 can specify where and how the components of the deep packet inspection function 142 will be instantiated. Thus, in some embodiments the recipe can specify that the infrastructure control 112 will load the components of the deep packet inspection function 142 to the virtual machines as shown in FIG. 4. In some other embodiments, the recipe can specify that the network control 118 can establish the deep packet inspection virtual switch 202 after allocation of resources by the infrastructure control 112. In yet other embodiments, the service control 122 can load the deep packet inspection virtual function 204 to the virtual machines or other resources allocated by the infrastructure control 112. Thus, it should be understood that the various components of the control system 102 can instantiate and/or validate the components of the deep packet inspection function 142.

According to various embodiments, an event can be reported to an infrastructure DCAE process and/or the infrastructure inventory can be updated as part of operation 408. Although not shown in FIG. 4, it should be understood that the operations management controller 106 module of the control system 102 can instruct the infrastructure control 112, or a component thereof, to instantiate one or more virtual machines. Thus, in some embodiments of the concepts and technologies described herein, where the components of the control system 102 can be distributed across multiple devices, it should be understood that communications between the components can occur to trigger one or more of the operations illustrated and described herein. It should be understood that this example is illustrative and therefore should not be construed as being limiting in any way.

In some embodiments of the method 400, the virtual machines and/or multiple virtual functions can be instantiated by the infrastructure control 112 module of the control system 102, while one or more deep packet inspection functions 142 and/or components thereof (e.g., a deep packet inspection virtual switch 202 and/or a deep packet inspection virtual function 204) can be instantiated and/or configured by the network control 118 and/or the service control 122 as mentioned above. As such, in some embodiments, the control system 102 can perform operation 408 by executing the operations management controller 106, the infrastructure control 112, the network control 118, the service control 122 and/or functionality associated with the operations management controller 106, the infrastructure control 112, the network control 118, and/or the service control 122 as illustrated in FIG. 4. It should be understood that this example is illustrative and therefore should not be construed as being limiting in any way.

From operation 408, the method 400 proceeds to operation 410. At operation 410, the control system 102 can establish transport between the virtual machines instantiated in operation 408 (and in some embodiments the deep packet inspection function 142 and/or components thereof instantiated and/or configured in operation 410) and update the inventory 110 and/or one or more local inventories. Thus, operation 410 can include instructing the network control 118 to establish the deep packet inspection virtual switch 202 and/or instructing the service control 122 to establish the deep packet inspection virtual function 204. Additionally, operation 410 can include the network control 118 creating transport or ensuring that transport exists between the network control 118 and the deep packet inspection virtual switch 204, as well as creating transport or ensuring that transport exists between the service control 122 and the deep packet inspection virtual function 204. In some embodiments, the control system 102 can perform operation 410 by executing the network control 118 and/or functionality associated with the network control 118 as illustrated in FIG. 4. It should be understood that this example is illustrative and therefore should not be construed as being limiting in any way.

In some embodiments of the method 400, the method 400 can proceed from operation 410 to operation 412. In particular, in some embodiments of the method 400 in which the one or more deep packet inspection functions 142 (and/or one or more deep packet inspection virtual functions 204 associated therewith) were not configured at operation 408, the method 400 can proceed from operation 410 to operation 412. In some other embodiments of the method 400 in which the deep packet inspection function 142 and/or components thereof such as the deep packet inspection virtual switch 202 and/or the deep packet inspection virtual function 204 have been configured, the method 400 can flow from operation 410 to operation 414.

At operation 412, the control system 102 can configure the deep packet inspection function 142 and/or one or more deep packet inspection virtual switches 202 or deep packet inspection virtual functions 204 thereof, which may be instantiated in operation 408. As used herein with reference to operation 412, "configuring" the deep packet inspection function 142 and/or components thereof can refer to activating the deep packet inspection function 142 and/or establishing a base or default configuration for the deep packet inspection function 142. Thus, operation 412 can include specifying what application programming interfaces the deep packet inspection function 142 will use, expose, or access, or the like.

It can be appreciated that if the deep packet inspection functions 142 (and/or the deep packet inspection virtual switches 202 or the virtual functions 204 thereof) are instantiated and configured in operation 408, that operation 412 may be skipped or omitted. Thus, it can be appreciated that operation 412 may be performed by the control system 102, in some embodiments, where the infrastructure control 112 instantiates the deep packet inspection functions 142 (and/or the deep packet inspection virtual switches 202 or the deep packet inspection virtual functions 204) in operation 408, though this is not necessarily the case. In some embodiments, the control system 102 can perform operation 412 by executing the service control 122 and/or functionality associated with the service control 122 as illustrated in FIG. 4. It should be understood that this example is illustrative and therefore should not be construed as being limiting in any way.

From operations 410 or 412, the method 400 proceeds to operation 414. At operation 414, the control system 102 can establish transport between the deep packet inspection function 142 and other services 134 with which the deep packet inspection function 142 is associated, to which the deep packet inspection function 142 is chained, from which the deep packet inspection function 142 receives the traffic 300, to which the deep packet inspection function 142 routes the traffic 300, combinations thereof, or the like. It should be appreciated that in some embodiments of the method 400 in which operation 412 is omitted, operations 410 and 414 can be combined into a single operation. It should be understood that this example is illustrative and therefore should not be construed as being limiting in any way. In some embodiments, the control system 102 can perform operation 414 by executing the network control 118 and/or functionality associated with the network control 118 as illustrated in FIG. 4. It should be understood that this example is illustrative and therefore should not be construed as being limiting in any way.

From operation 414, the method 400 proceeds to operation 416. At operation 416, the control system 102 can validate the service 134 end-to-end and update the inventory 110. In some embodiments, each of the scope domains can validate the service 134 or portion associated with that scope domain instead of the control system 102 providing end-to-end validation. In some embodiments in which the operations management controller 106 validates the service 134 end-to-end, the control system 102 can perform operation 416 by executing the operations management controller 106 and/or functionality associated with the operations management controller 106 as illustrated in FIG. 4. In some embodiments in which each of the scope domains validates a portion of the service 134, the control system 102 can perform operation 416 by executing the operations management controller 106, the infrastructure control 112, the network control 118, and/or the service control 122 and/or functionality associated with these modules. It should be understood that this example is illustrative and therefore should not be construed as being limiting in any way.

While the above description of the method 400 has described instantiation of the deep packet inspection function 142 and/or components thereof, it should be understood that the deep packet inspection virtual functions 204 may be instantiated in the method 400 and the deep packet inspection virtual switch 202 may be instantiated and/or configured at other times, if desired. Thus, for example, the deep packet inspection virtual function 204 can be instantiated and/or configured in the method 400 and the deep packet inspection virtual switch 202 can be configured by the deep packet inspection virtual function 204 as will be illustrated and described in more detail herein with reference to FIGS. 7-8. It should be understood that these examples are illustrative and therefore should not be construed as being limiting in any way.

From operation 416, the method 400 proceeds to operation 418. The method 400 ends at operation 418.

Figure 5:
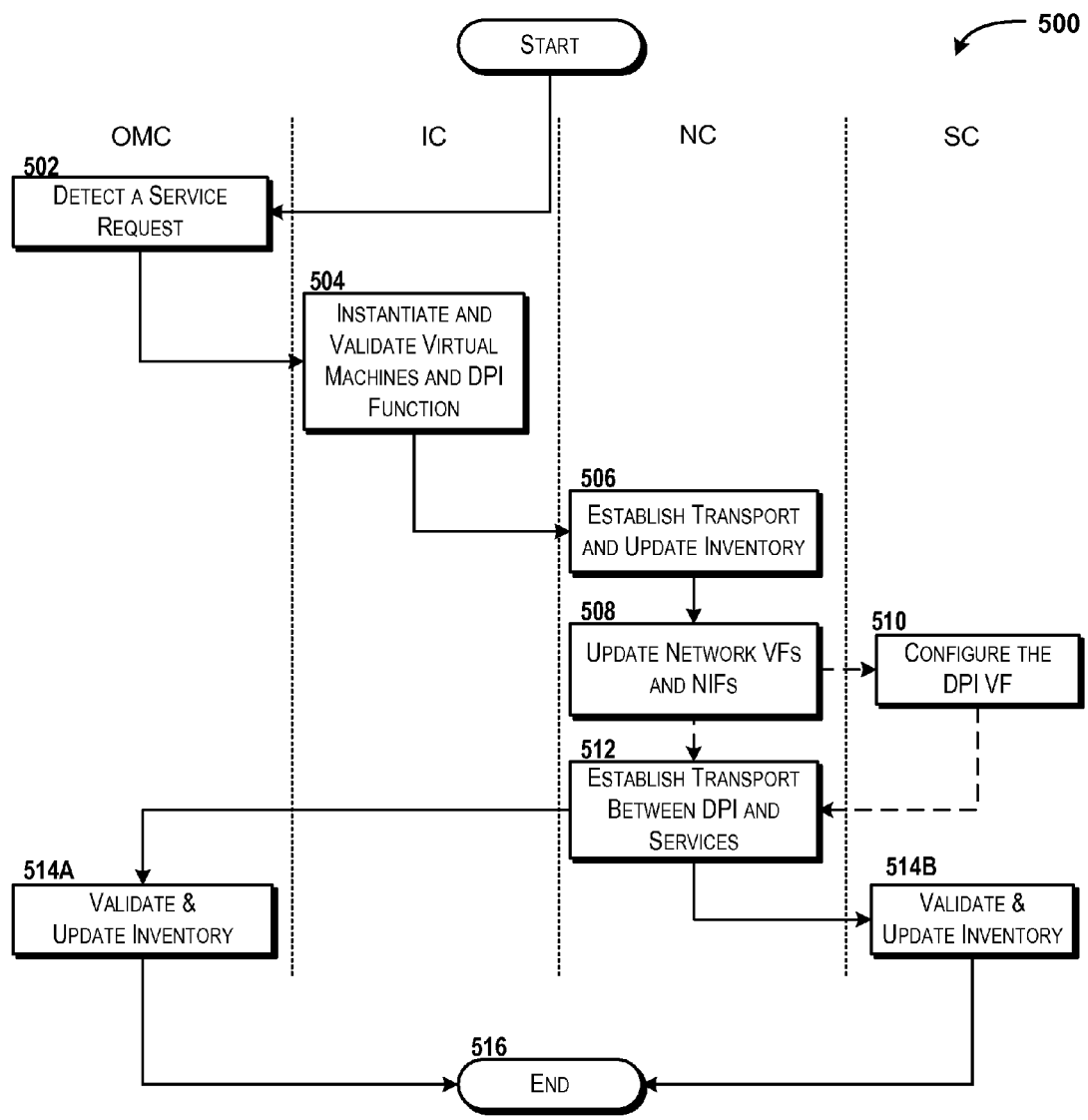
FIG. 5 is a flow diagram showing aspects of a method for scaling a deep packet inspection function, according to an illustrative embodiment of the concepts and technologies described herein.

Turning now to FIG. 5, aspects of a method 500 for scaling a deep packet inspection function 142 will be described in detail, according to an illustrative embodiment. The method 500 begins at operation 502. At operation 502, the control system 102 can detect (or receive) a service request. According to various embodiments of the concepts and technologies described herein, the service request detected or received in operation 502 can correspond to a request to adjust or change a capacity associated with the service 134, or another type of service request. In some embodiments, the control system 102 can perform operation 502 by executing the operations management controller 106 and/or functionality associated with the operations management controller 106 as illustrated in FIG. 5. It should be understood that this example is illustrative and therefore should not be construed as being limiting in any way.

From operation 502, the method 500 proceeds to operation 504. At operation 504, the control system 102 can instantiate and validate one or more virtual machines associated with the service 134 and one or more deep packet inspection functions 142. As explained above with reference to FIG. 4, the images loaded and/or validated in operation 504 can include an embedded or standalone deep packet inspection function 142 and/or one or more components thereof such as a deep packet inspection virtual switch 202 and/or a deep packet inspection virtual function 204. Thus, as explained above, the control system 102 can analyze the recipes, policies, or the like, to determine what virtual machines and/or functions are to be created, updated, or the like, as well as to determine what deep packet inspection functions 142 and/or components are to be created, updated, or the like.

According to various embodiments of the concepts and technologies described herein, the instantiation of the deep packet inspection function 142 can be completed by one or more of the infrastructure control 112, the network control 118, and/or the service control 122. Thus, while FIG. 5 shows the instantiation of the deep packet inspection function 142 at the infrastructure control 112, it should be understood that this embodiment is one example and should not be construed as being limiting in any way. In particular, in some embodiments the infrastructure control 112 can instantiate one or more virtual machines and load images to the virtual machines where the images can include components of the service 134 and components of the deep packet inspection function 142. Alternatively, the network control 118 and/or the service control 122 can instantiate one or more components of the deep packet inspection function 142.

In some embodiments, a recipe for a service 134 and/or a deep packet inspection function 142 embedded in and/or associated with a service 134 can specify where and how the components of the deep packet inspection function 142 will be instantiated. Thus, in some embodiments the recipe can specify that the infrastructure control 112 will load the components of the deep packet inspection function 142 to the virtual machines as shown in FIG. 5. In some other embodiments, the recipe can specify that the network control 118 can establish the deep packet inspection virtual switch 202 after allocation of resources by the infrastructure control 112. In yet other embodiments, the service control 122 can load the deep packet inspection virtual function 204 to the virtual machines or other resources allocated by the infrastructure control 112. Thus, it should be understood that the various components of the control system 102 can instantiate and/or validate the components of the deep packet inspection function 142.

Although not shown in FIG. 5, it should be understood that the operations management controller 106 module of the control system 102 can instruct the infrastructure control 112, or a component thereof, to instantiate one or more virtual machines. Thus, in some embodiments where the components of the control system 102 are distributed across multiple devices, it should be understood that communications between the components can occur to trigger one or more of the operations illustrated and described herein. It should be understood that this example is illustrative and therefore should not be construed as being limiting in any way.

In some embodiments, the control system 102 can perform operation 504 by executing the operations management controller 106, the infrastructure control 112, the network control 118, the service control 122, and/or functionality associated with the operations management controller 106, the infrastructure control 112, the network control 118, and/or the service control 122. It should be understood that this example is illustrative and therefore should not be construed as being limiting in any way.

From operation 504, the method 500 proceeds to operation 506. At operation 506, the control system 102 can establish transport between the virtual machines and/or respective functions instantiated in operation 504 and update the inventory 110. Thus, in various embodiments of the concepts and technologies described herein, operation 506 can include establishing transport between these and/or other functions and the components of the deep packet inspection function 142 including, but not limited to, the deep packet inspection virtual switch 202 and/or the deep packet inspection virtual function 204, and/or one or more virtual machines instantiated in operation. In some embodiments, the control system 102 can update the inventory 110 and/or the local inventories associated with the various components or modules of the control system 102 to reflect creation and/or establishment of the transport in operation 506. Additionally, operation 506 can include the network control 118 creating transport or ensuring that transport exists between the network control 118 and the deep packet inspection virtual switch 204, as well as creating transport or ensuring that transport exists between the service control 122 and the deep packet inspection virtual function 204. In some embodiments, the control system 102 can perform operation 506 by executing the network control 118 and/or functionality associated with the network control 118 as illustrated in FIG. 5. It should be understood that this example is illustrative and therefore should not be construed as being limiting in any way.

From operation 506, the method 500 proceeds to operation 508. At operation 508, the control system 102 can update network virtual functions and/or network infrastructure networking functions. In some embodiments, the control system 102 can perform operation 508 by executing the network control 118 and/or functionality associated with the network control 118 as illustrated in FIG. 5. It should be understood that this example is illustrative and therefore should not be construed as being limiting in any way.

In some embodiments of the method 500, the method 500 can proceed from operation 508 to operation 510. In particular, in some embodiments of the method 500 in which the deep packet inspection function 142 and/or components thereof such as the deep packet inspection virtual switch 202 and the deep packet inspection virtual function 204 were not configured at operation 508, the method 500 can proceed from operation 508 to operation 510. In some other embodiments of the method 500 in which the deep packet inspection function 142 and/or components thereof such as the deep packet inspection virtual switch 202 and the deep packet inspection virtual function 204 have been configured, the method 500 can flow from operation 508 to operation 512.

At operation 510, the control system 102 can configure the deep packet inspection function 142 and/or components thereof such as the deep packet inspection virtual switch 202 and the deep packet inspection virtual function 204. Configuring the deep packet inspection function 142 and/or components thereof in operation 510 can include activating the deep packet inspection function 142 and/or establishing a base or default configuration for the deep packet inspection function 142. Thus, operation 510 can include specifying what application programming interfaces the deep packet inspection function 142 will use, expose, or access, or the like. In some embodiments, the control system 102 can perform operation 510 by executing the service control 122 and/or functionality associated with the service control 122 as illustrated in FIG. 5. It should be understood that this example is illustrative and therefore should not be construed as being limiting in any way.

From operations 508 or 510, the method 500 proceeds to operation 512. At operation 512, the control system 102 can establish transport between the deep packet inspection function 142 and other services 134. It should be appreciated that in some embodiments of the method 500 in which operation 510 is omitted, operations 508 and 512 can be combined into a single operation. It should be understood that this example is illustrative and therefore should not be construed as being limiting in any way.

In some embodiments, the control system 102 can perform operation 512 by executing the network control 118 and/or functionality associated with the network control 118 as illustrated in FIG. 5. It should be understood that this example is illustrative and therefore should not be construed as being limiting in any way.

From operation 512, the method 500 proceeds to either operation 514A or 514B. At operations 514A and 514B, the control system 102 can validate the service end-to-end and update the inventory 110. As explained above, controls or control functions associated with each of the scope domains can validate a portion of the service 134 and/or components thereof associated with the domains. In some embodiments, the control system 102 can perform operation 514A by executing the operations management controller 106 and/or functionality associated with the operations management controller 106 as illustrated in FIG. 5. In some embodiments, the control system 102 can perform operation 514B by executing the service control 122 and/or functionality associated with the service control 122 as illustrated in FIG. 5. It should be understood that this example is illustrative and therefore should not be construed as being limiting in any way.

As explained above with reference to the method 400, it should be understood that the deep packet inspection virtual functions 204 may be instantiated in the method 500 and that the deep packet inspection virtual switch 202 may be instantiated and/or configured at other times and/or via execution of other methods and/or processes, if desired. Thus, the method 500 can be used to instantiate and/or configure the deep packet inspection virtual function 204 and the deep packet inspection virtual switch 202 can be configured by the deep packet inspection virtual function 204 at other times as will be illustrated and described in more detail herein with reference to FIGS. 7-8. In some other embodiments, the deep packet inspection function 142 and/or components thereof can be instantiated and/or configured by way of the method 500. As such, the illustrated embodiment should be understood as being illustrative and therefore should not be construed as being limiting in any way.

From operations 514A or 514B, the method 500 proceeds to operation 516. The method 500 ends at operation 516.

Figure 6:
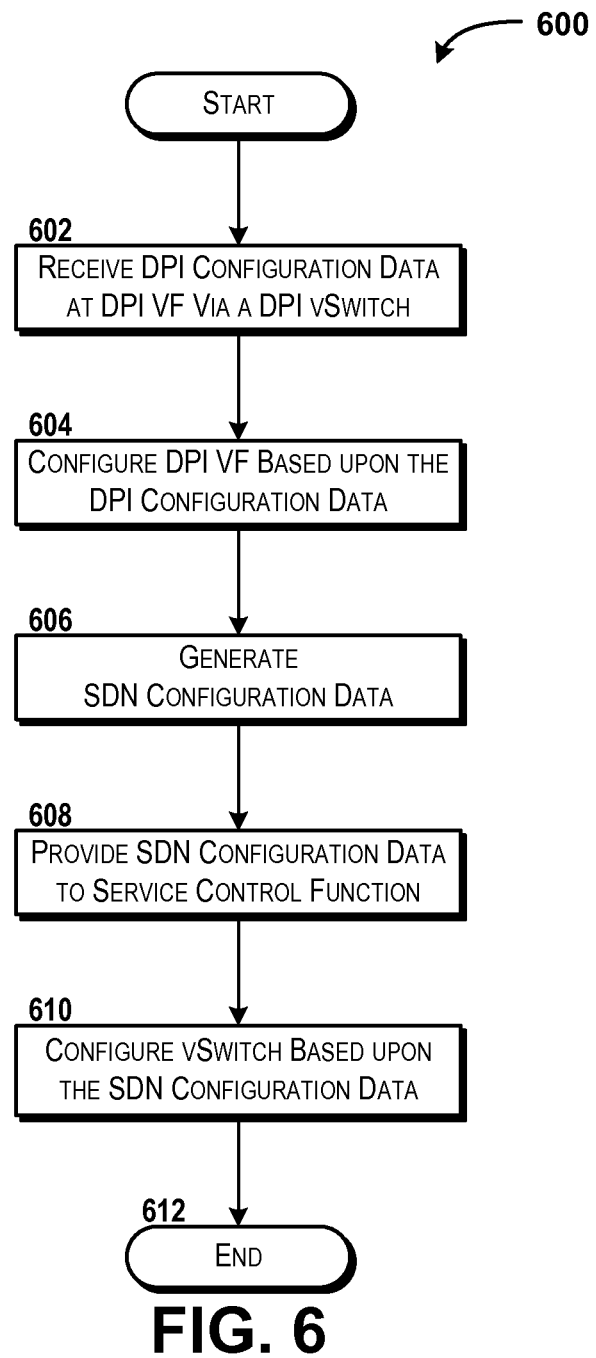
FIG. 6 is a flow diagram showing aspects of a method for configuring a deep packet inspection function, according to an illustrative embodiment of the concepts and technologies described herein.

Turning now to FIG. 6, aspects of a method 600 for configuring a deep packet inspection function 142 will be described in detail, according to an illustrative embodiment. The method 600 begins at operation 602. At operation 602, the computer system 200 can receive deep packet inspection configuration data 206. Specifically, the deep packet inspection configuration data 206 can be received at a deep packet inspection virtual function 204 hosted on the computer system 200 via a deep packet inspection virtual switch 202 hosted on the computer system 200.

As explained above, the deep packet inspection configuration data 206 can include data that instructs the deep packet inspection virtual function 204 and/or other components of the deep packet inspection function 142 regarding how deep packet inspection is to be completed by the deep packet inspection function 142. Thus, the deep packet inspection configuration data 206 can include instructions for inspecting traffic 300, how to handle the traffic 300, actions to take in response to receiving and/or analyzing the traffic 300, combinations thereof, and the like. The deep packet inspection configuration data 206 also can define how the traffic 300 is handled during and/or after the analysis of the deep packet inspection function 142.

From operation 602, the method 600 proceeds to operation 604. At operation 604, the computer system 200 can configure the deep packet inspection virtual function 204 based upon the deep packet inspection configuration data 206 received in operation 602. According to various embodiments, the deep packet inspection configuration data 206 can define how the deep packet inspection function 142 is to perform the deep packet inspection, how packets and/or other data flows are to be handled during or after the deep packet inspection, and/or various actions and/or event reporting functions that can be completed during or after the deep packet inspection, combinations thereof, or the like.

From operation 604, the method 600 proceeds to operation 606. At operation 606, the computer system 200 can generate SDN configuration data 210. The computer system 200 can generate the SDN configuration data 210 for forwarding to the network control 118 and/or a module thereof, which can be hosted and/or executed by the computer system 200 and/or the control system 102. The SDN configuration data 210 can instruct the network control 118 regarding configuration of the deep packet inspection virtual switch 202 and therefore can be generated by the deep packet inspection virtual function 204 to configure the deep packet inspection virtual switch 202 to take certain actions without involving the deep packet inspection virtual function 204. For example, the SDN configuration data 210 can be generated to instruct the deep packet inspection virtual switch 202 to block traffic 300, to fork traffic 300, or the like.

From operation 606, the method 600 proceeds to operation 608. At operation 608, the computer system 200 can provide the SDN configuration data 210 to a service control function associated with the service control 122 and the service control 122 and/or the service control function can provide the SDN configuration data 210 to the network control 118 and/or a network control function associated with the network control 118. In some embodiments, the SDN configuration data 210 can be provided directly to the network control 118, while in some other embodiments the SDN configuration data 210 can be provided to the network control 118 via the service control 122. Thus, the deep packet inspection virtual function 204 can effectively provide SDN configuration data 210 to the deep packet inspection virtual switch 202 via generating the SDN configuration data 210 and providing the SDN configuration data 210 to the network control 118 directly and/or via the service control 122. The network control 118 can provide the SDN configuration data 210 to the deep packet inspection virtual switch 202, though not shown in FIG. 6.

From operation 608, the method 600 proceeds to operation 610. At operation 610, the computer system 200 and/or the control system 102 can configure the deep packet inspection virtual switch 202 based upon the SDN configuration data 210. In particular, the control system 102 and/or the computer system 200 can configure the deep packet inspection virtual switch 202 via execution of the network control 118 and/or other module. Thus, it can be appreciated that the deep packet inspection virtual switch 202 can be configured using SDN technologies. It should be understood that this example is illustrative and therefore should not be construed as being limiting in any way.

From operation 610, the method 600 proceeds to operation 612. The method 600 ends at operation 612.

Figure 7:
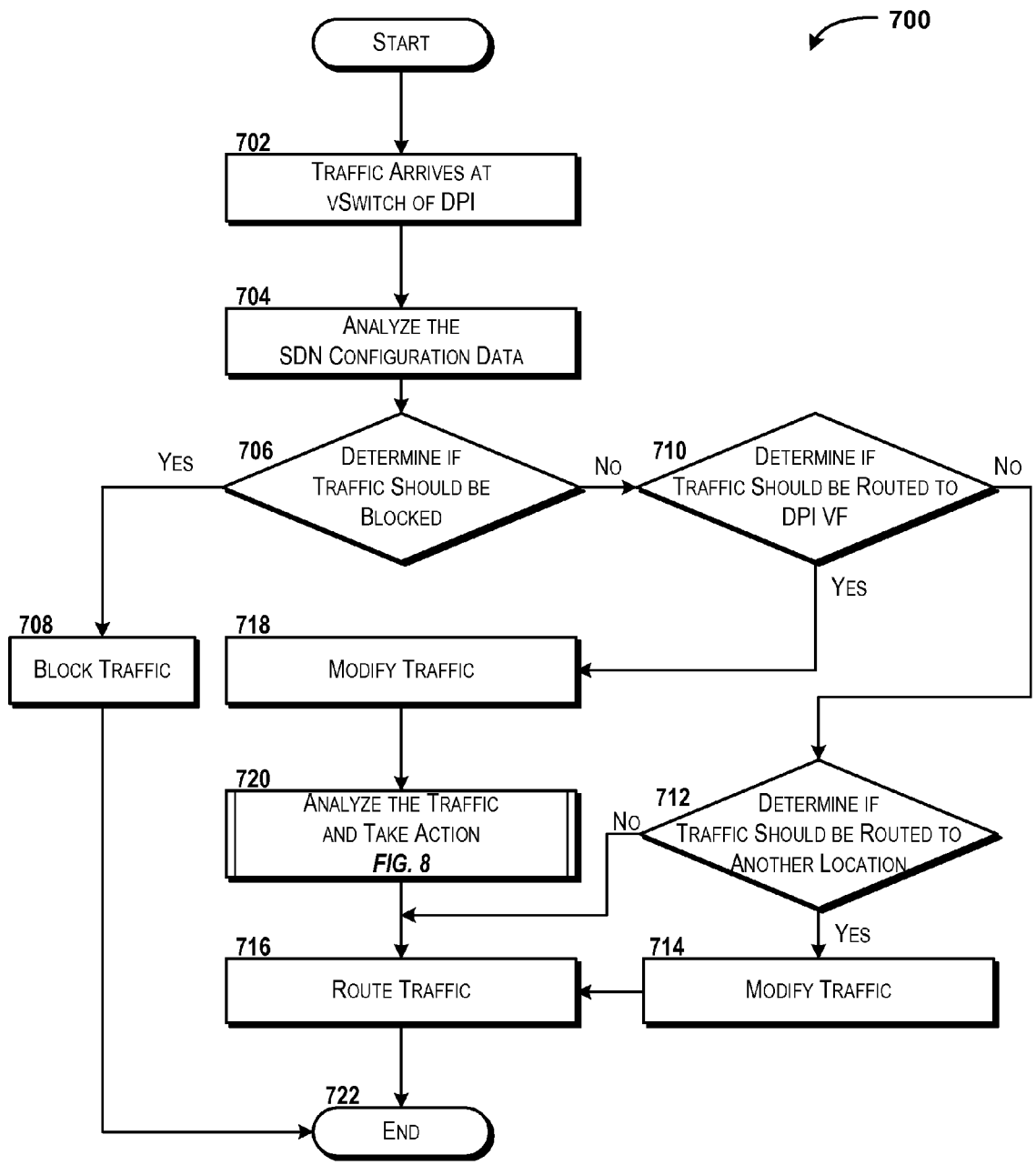
FIG. 7 is a flow diagram showing aspects of a method for using a deep packet inspection function, according to an illustrative embodiment of the concepts and technologies described herein.

Turning now to FIG. 7, aspects of a method 700 for using a deep packet inspection function 142 will be described in detail, according to an illustrative embodiment. The method 700 begins at operation 702. At operation 702, traffic 300 can arrive at the deep packet inspection virtual switch 202 hosted by the computer system 200. Thus, in operation 702, the computer system 200 can, via execution of the deep packet inspection virtual switch 202, detect arrival of the traffic 300 at the deep packet inspection virtual switch 202. Because the traffic 300 may or may not be detected, and because the traffic 300 may arrive at the deep packet inspection function 142 in additional and/or alternative ways, it should be understood that this example is illustrative and therefore should not be construed as being limiting in any way.

From operation 702, the method 700 proceeds to operation 704. At operation 704, the computer system 200 can analyze the SDN configuration data 210 to determine an action to take with respect to the traffic 300 received (or detected) in operation 702. Thus, it can be appreciated that the SDN configuration data 210 can define rules or policies that define how traffic 300 is handled based upon a source, destination, or route associated with the traffic 300; based upon contents of the traffic 300 (e.g., the payload 308 of one or more data packets 304 of the traffic 300); data in the routing tables 208; combinations thereof; or the like. It should be understood that the analysis illustrated in operation 704 can be completed by the deep packet inspection virtual switch 202, in some embodiments and therefore can occur at the network layer instead of, or in addition to, the application or service layer.

From operation 704, the method 700 proceeds to operation 706. At operation 706, the computer system 200 can determine if the traffic 300 should be blocked. The determination illustrated in operation 706 can be made based upon the analysis illustrated in operation 704, if desired. If the computer system 200 determines, in operation 706, that the traffic 300 should be blocked, the method 700 can proceed to operation 708. At operation 708, the computer system 200 can block the traffic 300. It can be appreciated with reference to FIG. 3 that he blocked traffic 300 can be dropped, quarantined, and/or returned to a sender via the blocked traffic path 314 shown in FIG. 3. Because the blocked traffic 300 can be stored, disposed of in other ways, and/or subjected to other operations, it should be understood that this example is illustrative and therefore should not be construed as being limiting in any way.

If the computer system 200 determines, in operation 706, that the traffic 300 should not be blocked, the method 700 can proceed to operation 710. At operation 710, the computer system 200 can determine if the traffic 300 should be routed to the deep packet inspection virtual function 204. Again, this determination can be based upon the routing tables 208 and/or information included in the SDN configuration data 210 as well as information associated with the traffic 300. If the computer system 200 determines, in operation 710, that the traffic 300 should not be routed to the deep packet inspection virtual function 204, the method 700 can proceed to operation 712.

At operation 712, the computer system 200 can determine if the traffic 300 should be routed to another location. Thus, for example, the computer system 200 can determine that the traffic 300 should be routed to service 134, forked and routed to another location, copied and saved to a data storage device or location, routed to an alternative recipient, or the like.

If the computer system 200 determines, in operation 712, that the traffic 300 should be routed to another location, the method 700 can proceed to operation 714. At operation 714, the computer system 200 can modify or insert one or more headers 306 into the traffic 300 and/or data packets 304 included in the traffic 300. Thus, in operation 714, the computer system 200 can modify headers 306 associated with the traffic 300 to effect routing of the traffic 300 to a determined location such as a service 134, a data storage device, an alternative recipient, or the like.

From operation 714, the method 700 can proceed to operation 716. The method 700 also can proceed to operation 716 from operation 712 if the computer system 200 determines, in operation 712, that the traffic 300 should not be routed to another location. At operation 716, the computer system 200 can route the traffic 300 to the destination or location determined in operation 712. It can be appreciated that the computer system 200 may not actively route the traffic 300 and that the computer system 200 may instead output the traffic 300 for routing in accordance with a header 306 or modified header 306. Because routing of the traffic 300 can occur in a number of manners, various embodiments of routing the traffic 300 will not be described in additional detail.

Returning now to operation 710, if the computer system 200 determines that the traffic 300 should be routed to the deep packet inspection virtual function 204, the method 700 can proceed to operation 718. At operation 718, the computer system 200 can modify and/or insert one or more headers 306 (e.g., network headers) of one or more data packets 304 included in the traffic 300 to effect routing of the traffic 300 to the deep packet inspection virtual function 204. From operation 718, the method 700 can proceed to operation 720.

At operation 720, the computer system 200 can analyze the traffic 300 received in operation 702 and take an action with respect to the traffic 300. The action taken in operation 720 can be based upon an analysis of the deep packet inspection configuration data 206. Additional details of analyzing the traffic 300 and the deep packet inspection configuration data 206 and taking action based upon the analysis will be illustrated and described in more detail below with reference to FIG. 8. Briefly, the computer system 200 can analyze the traffic 300, analyze the deep packet inspection configuration data 206, and take various actions based upon the analysis including, but not limited to, creating events, modifying the traffic 300, storing the traffic 300, updating the deep packet inspection virtual switch 202, modifying the SDN configuration data 210, combinations thereof, or the like. Because additional and/or alternative actions can be taken with respect to the traffic 300, it should be understood that these examples are illustrative and therefore should not be construed as being limiting in any way.

From operation 720, the method 700 proceeds to operation 716. Operation 716 was described above. From operation 716, the method 700 can proceed to operation 722. The method 700 also can proceed to operation 722 from operation 708. The method 700 ends at operation 722.

Figure 8:
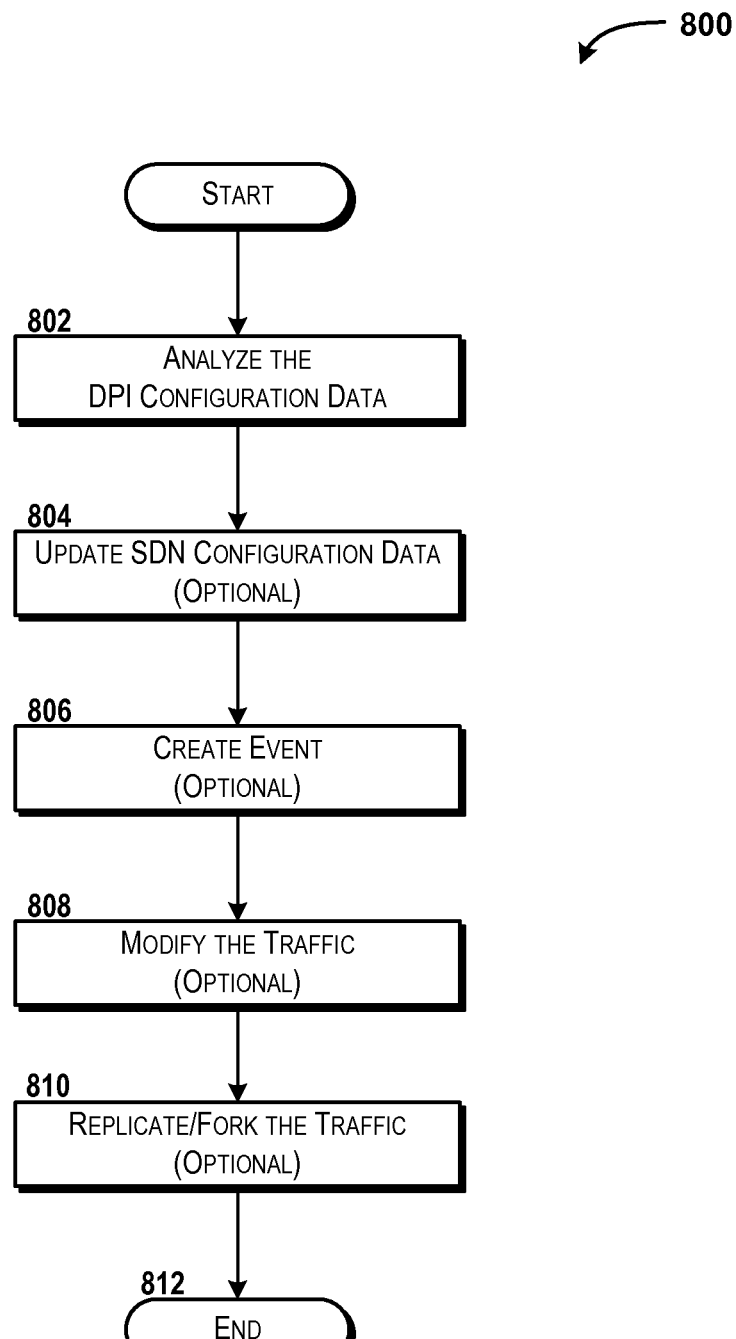
FIG. 8 is a flow diagram showing aspects of a method for analyzing traffic and taking action using a deep packet inspection function, according to an illustrative embodiment of the concepts and technologies described herein.

Turning now to FIG. 8, aspects of a method 800 for analyzing traffic 300 and taking action using a deep packet inspection function 142 will be described in detail, according to an illustrative embodiment. It should be understood that the operations of the method 800 can be, but are not necessarily, executed by the computer system 200 at operation 720 of the method 700 illustrated and described above with reference to FIG. 7. Because the operations of the method 800 can be performed at additional and/or alternative times, it should be understood that this example is illustrative and therefore should not be construed as being limiting in any way.

The method 800 begins at operation 802. At operation 802, the computer system 200 can analyze the deep packet inspection configuration data 206 to determine an action to take with respect to the traffic 300. In operation 802, the computer system 200 can analyze the traffic 300 received or detected in operation 702. In analyzing the traffic 300, the computer system 200 can analyze the traffic 300 (and/or data included in the traffic 300) to identify a sender and a recipient, as well as contents of the traffic 300. In some embodiments, the analysis of the traffic 300 can begin with an analysis of the headers 306 associated with data packets 304 included in the traffic 300, though this is not necessarily the case.

In some embodiments, the analysis can include analyzing the contents of the traffic 300 to determine what content is represented by the traffic 300. It can be appreciated from FIG. 2 that the content can be analyzed by analyzing payloads 308 of one or more data packets 304 associated with and/or included in the traffic 300, though this is not necessarily the case. Regardless of how the analysis is completed, the computer system 200 can detect malware, viruses, or other malicious traffic 300, as well as other traffic 300 that may be desirable or undesirable for various reasons. For example, the computer system 200 can detect traffic 300 associated with usage at peak times, types of traffic 300 that may be associated with premium services, traffic 300 that may be associated with low cost services, low quality of service traffic 300, combinations thereof, or the like). Thus, in operation 802, the computer system 200 can determine contents of the traffic 300, recipients of the traffic 300, senders of the traffic 300, other information, combinations thereof, or the like.

Based upon the analysis of the deep packet inspection configuration data 206 and the traffic 300, the computer system 200 can determine an action to take with respect to the traffic 300. The action that is determined can be taken at the application or service layer or the network layer of the infrastructure 114. The action taken by the computer system 200 with respect to the traffic 300 can include, but is not limited to, one or more of the actions depicted in operations 804-810. Because other actions can be taken, it should be understood that these examples are illustrative and therefore should not be construed as being limiting in any way.

From operation 802, the method 800 proceeds to operation 804. At operation 804, the computer system 200 optionally can update the SDN configuration data 210. Thus, in operation 804, the computer system 200 can optionally create new or modified SDN configuration data 210 that can instruct the deep packet inspection virtual switch 202 to modify handling of certain types of traffic 300 based upon the analysis illustrated and described in FIGS. 7-8. By creating new or modified SDN configuration data 210, the result of the SDN configuration data analysis performed at operation 704 of the method 700 can be changed for subsequent traffic 300 and therefore may not need to be routed to the deep packet inspection virtual function 204 by the deep packet inspection virtual switch 202.

Although not separately shown in FIG. 8, the computer system 200 can also output the new or modified SDN configuration data 210 and transmit the new or modified SDN configuration data 210 to the network control 118 for configuring the deep packet inspection virtual switch 202. As explained above, the SDN configuration data 210 can be provided directly to the network control 118 in some embodiments and in some other embodiments, the SDN configuration data 210 can be provided to the network control 118 via the service control 122 and/or a component thereof. The network control 118 can use the new or modified SDN configuration data 210 to configure the deep packet inspection virtual switch 202, in some embodiments, as explained above. It should be understood that this example is illustrative and therefore should not be construed as being limiting in any way.

From operation 804, the method 800 proceeds to operation 806. At operation 806, the computer system 200 optionally can create an event or report the traffic 300 to various entities. According to various embodiments, the computer system 200 can create an event and transmit the event through the deep packet inspection virtual switch 202. The events or reports can be routed to a DCAE process and/or to various entities associated with the control system 102, if desired. Although not separately shown in FIG. 8, the deep packet inspection virtual switch 202 can perform another analysis on the SDN configuration data 210 based upon receiving the event. Thus, it should be understood that the computer system 200 can again perform the functionality described herein with reference to operation 704 upon receiving the event. It should be understood that this example is illustrative and therefore should not be construed as being limiting in any way.

From operation 806, the method 800 proceeds to operation 808. At operation 808, the computer system 200 optionally can modify the traffic 300 and return the traffic 300 to the deep packet inspection virtual switch 202. In modifying the traffic 300, the computer system 200 can modify content or other information of the traffic 300, insert content or information into the traffic 300, remove content or information from the traffic 300, combinations thereof, or the like. Thus, in operation 808 the computer system 200 can modify the payload 308 of one or more data packets 304 included in the traffic 300, modify one or more headers 306 included in one or more data packets 304 included in the traffic 300, combinations thereof, or the like. Because the traffic 300 can be modified in additional and/or alternative ways, it should be understood that these examples are illustrative and therefore should not be construed as being limiting in any way.

From operation 808, the method 800 proceeds to operation 810. At operation 810, the computer system 200 optionally can replicate or fork the traffic 300. In operation 810, the computer system 200 can create a copy of the traffic 300. The original traffic 300 can be allowed to pass through the computer system 200 and the copy of the traffic 300 can be forked to another location, stored for future use, analyzed, or the like. Because the traffic 300 can be forked in additional and/or alternative manners, it should be understood that this example is illustrative and therefore should not be construed as being limiting in any way.

From operation 810, the method 800 proceeds to operation 812. The method 800 ends at operation 812.

Figure 9:
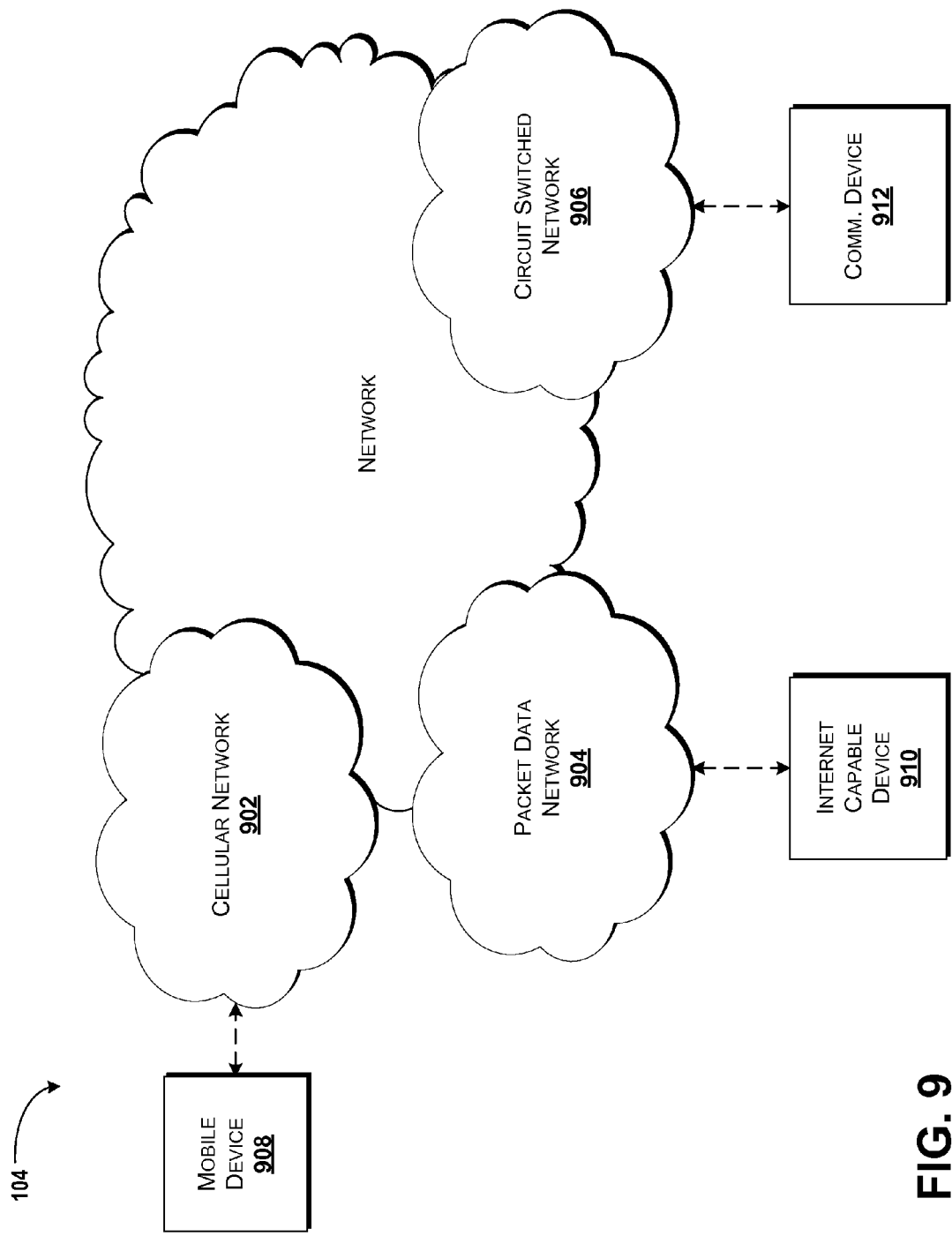
FIG. 9 schematically illustrates a network, according to an illustrative embodiment of the concepts and technologies described herein.

Turning now to FIG. 9, additional details of the network 104 are illustrated, according to an illustrative embodiment. The network 104 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 104 is used to refer broadly to any combination of the networks 902, 904, 906. It should be appreciated that substantially all of the functionality described with reference to the network 104 can be performed by the cellular network 902, the packet data network 904, and/or the circuit switched network 906, alone or in combination with other networks, network elements, and the like.

Figure 10:
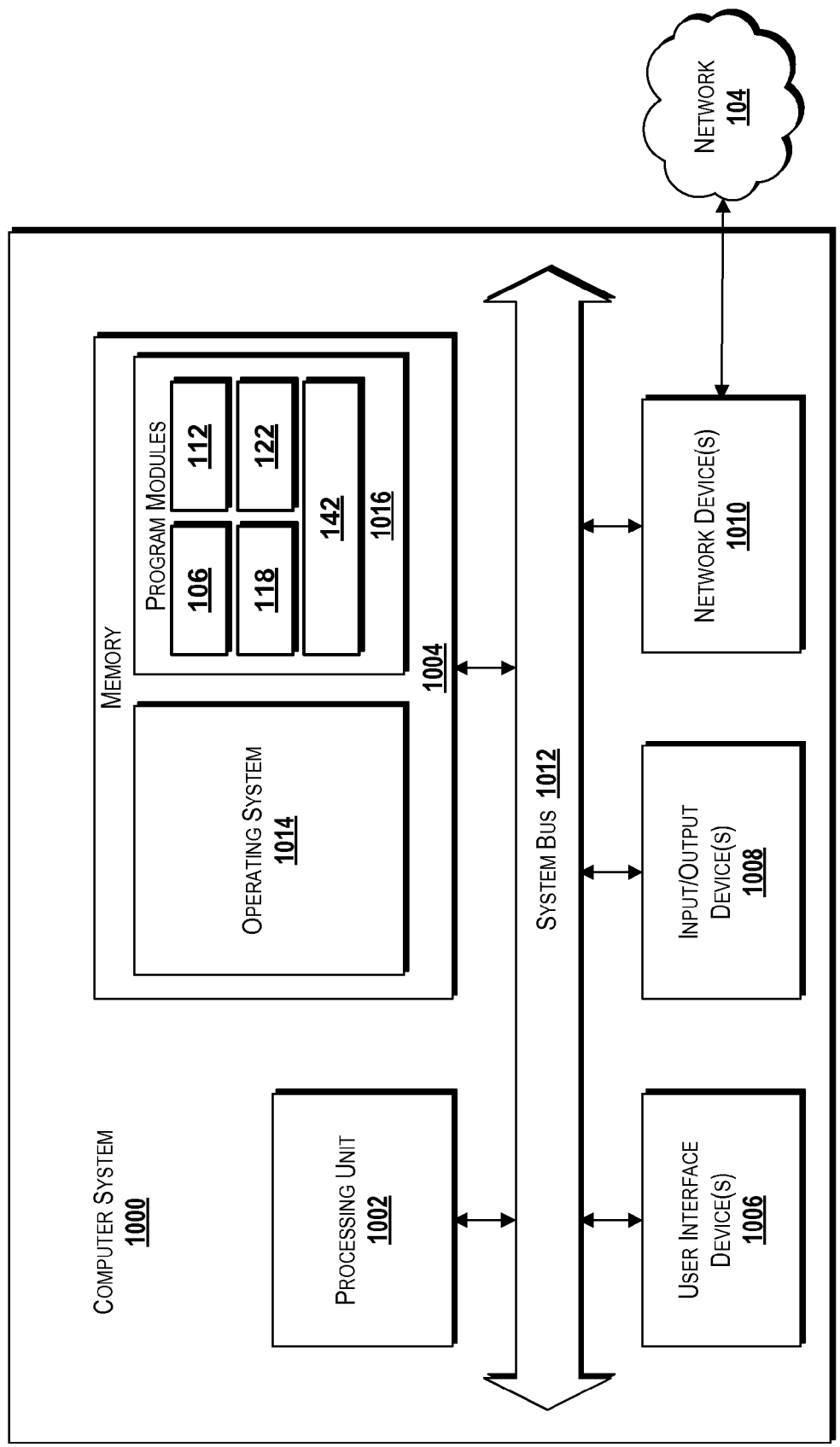
FIG. 10 is a block diagram illustrating an example computer system configured to provide and/or interact with a deep packet inspection virtual function, according to some illustrative embodiments of the concepts and technologies described herein.

FIG. 10 is a block diagram illustrating a computer system 1000 configured to provide the functionality described herein for creating and/or using a deep packet inspection virtual function such as the deep packet inspection function 142, in accordance with various embodiments of the concepts and technologies disclosed herein. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORA- TION, the FREEBSD family of operating systems, the SOLARIS family of operating systems from ORACLE CORPORATION, other operating systems, and the like.

The program modules 1016 may include various software and/or program modules described herein. In some embodiments, for example, the program modules 1016 include the operations management controller 106, the infrastructure control 112, the network control 118, the service control 122, the deep packet inspection function 142, and/or other modules illustrated and described herein. These and/or other programs can be embodied in computer-readable media containing instructions that, when executed by the processing unit 1002, perform one or more of the methods 400, 500, 600, 700, 800 described in detail above with respect to FIGS. 4-8. According to embodiments, the program modules 1016 may be embodied in hardware, software, firmware, or any combination thereof. Although not shown in FIG. 10, it should be understood that the memory 1004 also can be configured to store the policies, the service creation database 108, the inventory 110, the deep packet inspection configuration data 206, the SDN configuration data 210, and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network, such as the network 104. Examples of the network devices 1010 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a deep packet inspection virtual function have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
   detecting, at a control system comprising a processor, a service request that relates to a service;
   analyzing, by the processor, a policy to determine a function of the service, a virtual machine that will host the function, and a deep packet inspection virtual function associated with the service;
   triggering, by the processor, loading of an image to the virtual machine and instantiation of the virtual machine, wherein the image comprises the function of the service and the deep packet inspection virtual function; and
   validating, by the processor, the service and the deep packet inspection virtual function, wherein the deep packet inspection virtual function is associated with a deep packet inspection function, wherein the deep packet inspection virtual function receives deep packet inspection configuration data via a deep packet inspection virtual switch included in the deep packet inspection function, and wherein the deep packet inspection virtual function is configured based upon the deep packet inspection configuration data.

2. The method of claim 1, wherein triggering the loading of the image comprises:
   instructing an infrastructure control to load the image to the virtual machine, and requesting a network control to establish network transport between elements that will host the function and the deep packet inspection virtual function.

3. The method of claim 2, wherein the network transport comprises transport between the deep packet inspection function and the service.

4. The method of claim 1, wherein the deep packet inspection virtual function generates software defined networking configuration data and provides the software defined networking configuration data to a network control, and wherein the network control configures the deep packet inspection virtual switch using the software defined networking configuration data.

5. The method of claim 1, wherein the deep packet inspection function receives traffic, analyzes software defined networking configuration data and determines, based upon the software defined networking configuration data, if the traffic should be blocked.

6. The method of claim 5, further comprising:
if a determination is made that the traffic should not be blocked, analyzing the traffic; and
taking an action based upon the analyzing and the deep packet inspection configuration data.

7. The method of claim 6, wherein the action comprises one action selected from a group of actions consisting of:
creating an event and routing the event to a recipient;
modifying the traffic;
storing a copy of the traffic; and
forking the traffic.

8. The method of claim 1, wherein the service request comprises a request to create the service.

9. The method of claim 1, wherein the service request comprises a request to scale the service.

10. A system comprising:
a processor; and
a memory that stores computer-executable instructions that, when executed by the processor, cause the processor to perform operations comprising
detecting a service request that relates to a service,
analyzing, using the processor, a policy to identify a function of the service, a virtual machine that will host the function, and a deep packet inspection virtual function associated with the service,
triggering loading of an image to the virtual machine and instantiation of the virtual machine, wherein the image comprises the function of the service and the deep packet inspection virtual function, and
validating the service and the deep packet inspection virtual function, wherein the deep packet inspection virtual function is associated with a deep packet inspection function, wherein the deep packet inspection virtual function receives deep packet inspection configuration data via a deep packet inspection virtual switch included in the deep packet inspection function, and wherein the deep packet inspection virtual function is configured based upon the deep packet inspection configuration data.

11. The system of claim 10, wherein triggering the loading of the image comprises:

instructing an infrastructure control to load the image to the virtual machine, and
requesting a network control to establish network transport between elements to host the function and the deep packet inspection virtual function.

12. The system of claim 11, wherein the deep packet inspection virtual function generates software defined networking configuration data that configures the deep packet inspection virtual switch, and wherein the deep packet inspection function routes the software defined networking configuration data to the deep packet inspection virtual switch via the network control.

13. The system of claim 11, wherein the deep packet inspection virtual function generates software defined networking configuration data that configures the deep packet inspection virtual switch, and wherein the deep packet inspection function routes the software defined networking configuration data to the deep packet inspection virtual switch via a service control and the network control.

14. A computer storage medium having computer-executable instructions stored thereon that, when executed by a processor, cause the processor to perform operations comprising:
detecting a service request that relates to a service;
analyzing a policy to identify a function of the service, a virtual machine that will host the function, and a deep packet inspection virtual function associated with the service;
triggering loading of an image to the virtual machine and instantiation of the virtual machine, wherein the image comprises the function of the service and the deep packet inspection virtual function; and
validating the service and the deep packet inspection virtual function, wherein the deep packet inspection virtual function is associated with a deep packet inspection function, wherein the deep packet inspection virtual function receives deep packet inspection configuration data via a deep packet inspection virtual switch included in the deep packet inspection function, and wherein the deep packet inspection virtual function is configured based upon the deep packet inspection configuration data.

15. The computer storage medium of claim 14, wherein triggering the loading of the image comprises:
instructing an infrastructure control to load the image to the virtual machine; and
requesting a network control to establish network transport between elements to host the function and the deep packet inspection virtual function.

16. The computer storage medium of claim 14, wherein the deep packet inspection virtual function generates software defined networking configuration data that configures the deep packet inspection virtual switch, and wherein the deep packet inspection function routes the software defined networking configuration data to the deep packet inspection virtual switch via the network control.

* * * * *